US012658557B2

(12) United States Patent
Haines et al.

(10) Patent No.: US 12,658,557 B2
(45) Date of Patent: Jun. 16, 2026

(54) OFFSET ADAPTERS FOR VERTICAL ANTENNA MOUNTING PIPES AND RELATED ANTENNA MOUNT ASSEMBLIES

(71) Applicant: Outdoor Wireless Networks LLC, Claremont, NC (US)

(72) Inventors: Jared D. Haines, New York, NY (US); Ulrich A. Gienger, Fairview, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/755,883

(22) Filed: Jun. 27, 2024

(65) Prior Publication Data

US 2025/0062520 A1 Feb. 20, 2025

Related U.S. Application Data

(60) Provisional application No. 63/552,240, filed on Feb. 12, 2024, provisional application No. 63/519,432, filed on Aug. 14, 2023.

(51) Int. Cl.
*H01Q 1/12* (2006.01)

(52) U.S. Cl.
CPC ............ *H01Q 1/1228* (2013.01); *H01Q 1/12* (2013.01)

(58) Field of Classification Search
CPC .............................. H01Q 1/12; H01Q 1/1228
USPC ........................................... 248/218.4, 219.4
See application file for complete search history.

(56) References Cited

U.S. PATENT DOCUMENTS

| | | | | | |
|---|---|---|---|---|---|
| 2,575,917 | A * | 11/1951 | Johnson | E04G 7/16 | 16/358 |
| 4,957,251 | A * | 9/1990 | Hubbard | F16L 3/22 | 248/300 |
| 4,993,670 | A * | 2/1991 | Tesar | F16L 3/2235 | 248/74.1 |
| 5,920,291 | A * | 7/1999 | Bosley | H01Q 1/1207 | 343/890 |
| 5,954,305 | A * | 9/1999 | Calabro | H01Q 1/1242 | 343/890 |

(Continued)

FOREIGN PATENT DOCUMENTS

| | | | | |
|---|---|---|---|---|
| CN | 118555766 A * | 8/2024 | | H05K 5/0217 |
| DE | 202005009422 U1 * | 10/2005 | | H01Q 1/1207 |

(Continued)

*Primary Examiner* — Taylor Morris
(74) *Attorney, Agent, or Firm* — Myers Bigel, P.A.

(57) ABSTRACT

The present disclosure describes a sector frame antenna mount assembly. The assembly includes a plurality of horizontal members, each horizontal member having a length, a plurality of vertical members mounted on the horizontal members, each vertical member configured to have at least one antenna mounted thereon, and at least one offset adapter configured to mount a selected one of plurality of vertical members to a selected on of the plurality of horizontal members. The selected vertical member is repositioned via the at least one offset adapter from a first mounting location to a second mounting location along the length of the selected horizontal member or past an end of the selected horizontal member, thereby addressing issues with respect to passive intermodulation or other spacing issues within the assembly. Offset adapters and other related antenna mount assemblies are also described herein.

14 Claims, 21 Drawing Sheets

(56) References Cited

U.S. PATENT DOCUMENTS

| | | | | | |
|---|---|---|---|---|---|
| 5,971,345 | A * | 10/1999 | Khalaf | H01Q 1/1228 343/890 |
| 6,031,508 | A * | 2/2000 | Ishizuka | H01Q 1/125 343/882 |
| 6,273,377 | B1 * | 8/2001 | Archer | H01Q 1/12 248/300 |
| 6,480,172 | B1 * | 11/2002 | Sawyer | H01Q 1/12 343/890 |
| 6,561,473 | B1 * | 5/2003 | Ianello | F16B 7/0493 403/384 |
| 6,709,184 | B1 * | 3/2004 | McDonald | F16M 13/02 248/222.51 |
| 6,766,992 | B1 * | 7/2004 | Parker | F16M 13/022 248/219.3 |
| 7,113,145 | B1 * | 9/2006 | Noble | H01Q 1/1228 343/890 |
| 7,432,875 | B1 * | 10/2008 | Sergi | H01Q 1/1228 343/890 |
| 7,466,286 | B2 * | 12/2008 | Chapman | H01Q 1/1235 52/645 |
| 8,477,078 | B2 * | 7/2013 | Ludwick | H01Q 1/1235 343/882 |
| 8,686,919 | B1 * | 4/2014 | Sergi | H01Q 1/084 343/890 |
| 9,812,762 | B2 | 11/2017 | Skrepcinski et al. | |
| 9,853,346 | B2 | 12/2017 | Skrepcinski et al. | |
| 10,122,064 | B2 | 11/2018 | Skrepcinski et al. | |
| 11,159,006 | B2 * | 10/2021 | Heath | H02G 7/20 |
| 2008/0258026 | A1 * | 10/2008 | Smith | H02G 3/126 248/218.4 |
| 2011/0083399 | A1 * | 4/2011 | Lettkeman | E04H 12/24 248/219.4 |
| 2011/0279347 | A1 * | 11/2011 | Pass | E04G 3/243 343/890 |
| 2014/0048660 | A1 * | 2/2014 | Lettkeman | H01Q 1/1228 29/525.01 |
| 2016/0211569 | A1 * | 7/2016 | Skrepcinski | H01Q 1/1228 |
| 2018/0083337 | A1 * | 3/2018 | Roy | H01Q 1/12 |
| 2019/0348742 | A1 * | 11/2019 | Palmer | H01Q 1/1228 |
| 2020/0136244 | A1 * | 4/2020 | Chen | H01Q 1/002 |
| 2020/0411945 | A1 * | 12/2020 | Heath | E04B 7/18 |
| 2021/0190237 | A1 * | 6/2021 | Bell | H02G 3/263 |
| 2022/0052433 | A1 * | 2/2022 | Klein | H01Q 1/1228 |
| 2022/0085481 | A1 * | 3/2022 | Severin | H01Q 1/1228 |
| 2022/0238981 | A1 * | 7/2022 | Charles | F16M 13/02 |
| 2023/0061396 | A1 * | 3/2023 | Strishock | F16B 2/14 |
| 2023/0110480 | A1 * | 4/2023 | Sala | H01Q 1/246 343/872 |
| 2023/0395988 | A1 * | 12/2023 | Isambard | H01Q 1/002 |
| 2024/0275018 | A1 * | 8/2024 | Kolokotronis | H01Q 1/1228 |
| 2025/0337150 | A1 * | 10/2025 | Haines | H01Q 1/1228 |
| 2026/0031520 | A1 * | 1/2026 | Franceschino | H01Q 1/1228 |

FOREIGN PATENT DOCUMENTS

| | | | | | |
|---|---|---|---|---|---|
| FR | 1493641 | A * | 9/1967 | H01Q 1/1228 |
| FR | 2831472 | A1 * | 5/2003 | H01Q 1/125 |
| GB | 636068 | A * | 4/1950 | H01Q 1/1228 |
| GB | 808818 | A * | 2/1959 | H01Q 1/1228 |
| GB | 845261 | A * | 8/1960 | H01Q 1/1228 |
| GB | 1021993 | A * | 3/1966 | H01Q 1/1228 |
| GB | 2077846 | A * | 12/1981 | H01Q 1/1228 |
| KR | 20070021518 | A * | 2/2007 | H01Q 1/1228 |
| WO | WO-2023014471 | A1 * | 2/2023 | H01Q 1/1228 |

* cited by examiner

OFFSET ADAPTERS FOR VERTICAL ANTENNA MOUNTING PIPES AND RELATED ANTENNA MOUNT ASSEMBLIES

RELATED APPLICATION(S)

The present application claims priority to and the benefit of U.S. Provisional Patent Application No. 63/519,432, filed Aug. 14, 2023, and U.S. Provisional Patent Application No. 63/552,240, filed Feb. 12, 2024, the disclosures of which are hereby incorporated herein by reference in their entirety.

FIELD

The present application is directed generally toward telecommunications equipment, and more particularly, to offset adapters for antenna mounting pipes.

BACKGROUND

With increased demand for more wireless communication, the number of radio and antenna units that a tower traditionally supports has increased and is expected to continue to increase. New towers will need to be designed to support greater numbers of antenna and radio units, while existing towers are retrofitted to support more units, and effort is made to fully utilize space available on the towers.

An exemplary sector frame antenna mount assembly 10 is illustrated in FIGS. 1A-1B. The sector frame antenna mount assembly 10 includes a sector frame 20 for antenna mounting and an offset mount 30. The sector frame 20 includes horizontal members (pipes) 22 and vertical members (pipes) 24 which allow the mounting of antennas (not shown) thereon. The offset mount 30 is configured to be secured to the horizontal members 22 of the sector frame 20 (e.g., via mounting brackets or other fasteners 35) and may be used to position and secure the sector frame 20 (and antennas mounted thereon) a distance from a mounting structure (not shown). The sector frame 20 may also include one or more tie-back pipes 12 secured to the horizontal members 22 (via mounting brackets or other fasteners 15). See also, e.g., U.S. Pat. No. 9,812,762 to Skrepcinski et al.; U.S. Pat. No. 9,853,346 to Skrepcinski et al.; and U.S. Pat. No. 10,122,064 to Skrepcinski et al., the disclosures of which are hereby incorporated herein in full.

The vertical members 24 are secured to the horizontal members 22 (via mounting brackets or other fasteners 25) and are spaced apart along the length of the horizontal members 22 at least a minimum distance from each other to help mitigate or eliminate interference between the antennas. In some instances, it may be desirable to change the mounting location of one or more of the vertical members 24 on the horizontal member 22 to accommodate passive intermodulation (PIM) interference or other spacing issues. However, the desired mounting location on the horizontal member 22 may be obstructed (e.g., by one of the mounting brackets 15, 25, 35) or may be located past an end of the horizontal member 22. Thus, there may be a need for a device that allows a technician to change the mounting location of the vertical member 24 without having to change the sector frame 20 or components thereof.

SUMMARY

A first aspect of the present invention is directed to a sector frame antenna mount assembly. The assembly includes a plurality of horizontal members, each horizontal member having a length, a plurality of vertical members mounted on the horizontal members, each vertical member configured to have at least one antenna mounted thereon, and at least one offset adapter configured to mount a selected one of a plurality of vertical members to a selected one of the plurality of horizontal members. The selected vertical member is repositioned via at least one offset adapter from a first mounting location to a second mounting location along the length of the selected horizontal member or past an end of the selected horizontal member, thereby addressing issues with respect to passive intermodulation or other spacing issues within the assembly.

A second aspect of the present invention is directed to an offset adapter for a sector frame antenna mount assembly including a plurality of horizontal members and a plurality of vertical members. The offset adapter including a generally L-shaped or C-shaped main body having a height and a width, and a plurality of apertures, the plurality of apertures including at least two horizontally-elongated apertures relative to the width of the main body and at least two vertically-elongated apertures relative to the height of the main body. The at least two horizontally-elongated apertures are configured to receive one or more fasteners to engage and secure a selected vertical member of the plurality of vertical members to the offset adapter, the at least two vertically-elongated apertures are configured to receive one or more fasteners to engage and secure a selected horizontal member of the plurality of horizontal members to the offset adapter, and the offset adapter is configured to reposition the selected vertical member from a first mounting location to a second mounting location along a length of the selected horizontal member or past an end of the selected horizontal member.

A third aspect of the present invention is directed to a sector frame antenna mount assembly. The assembly includes a plurality of horizontal members, each horizontal member having a length, a plurality of vertical members mounted on the horizontal members, each vertical member configured to have at least one antenna mounted thereon, and at least one offset adapter. The at least one offset adapter includes a generally L-shaped or C-shaped main body having a height and a width, and a plurality of apertures, the plurality of apertures including at least two horizontally-elongated apertures relative to the width of the main body and at least two vertically-elongated apertures relative to the height of the main body. The at least two horizontally-elongated apertures are configured to receive one or more fasteners to engage and secure a selected vertical member of the plurality of vertical members to the offset adapter, the at least two vertically-elongated apertures are configured to receive one or more fasteners to engage and secure a selected horizontal member of the plurality of horizontal members to the offset adapter, and the offset adapter is configured to repositioned the selected vertical member from a first mounting location to a second mounting location along a length of the selected horizontal member or past an end of the selected horizontal member, thereby addressing issues with respect to passive intermodulation or other spacing issues within the assembly.

A fourth aspect of the present invention is directed to an offset adapter for a sector frame antenna mount assembly. The sector frame antenna mount assembly includes a plurality of horizontal members and a plurality of vertical members. The offset adapter includes a generally planar main body having a height and a width, and a plurality of apertures, the plurality of apertures including at least two horizontally-elongated apertures relative to the width of the main body and at least two vertically-elongated apertures relative to the height of the main body. The at least two horizontally-elongated apertures are configured to receive one or more fasteners to engage and secure a selected vertical member of the plurality of vertical members to the offset adapter. The at least two vertically-elongated apertures are configured to receive one or more fasteners to engage and secure a selected horizontal member of the plurality of horizontal members to the offset adapter. The offset adapter is configured to reposition the selected vertical member from a first mounting location to a second mounting location along a length of the selected horizontal member or past an end of the selected horizontal member.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim, accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
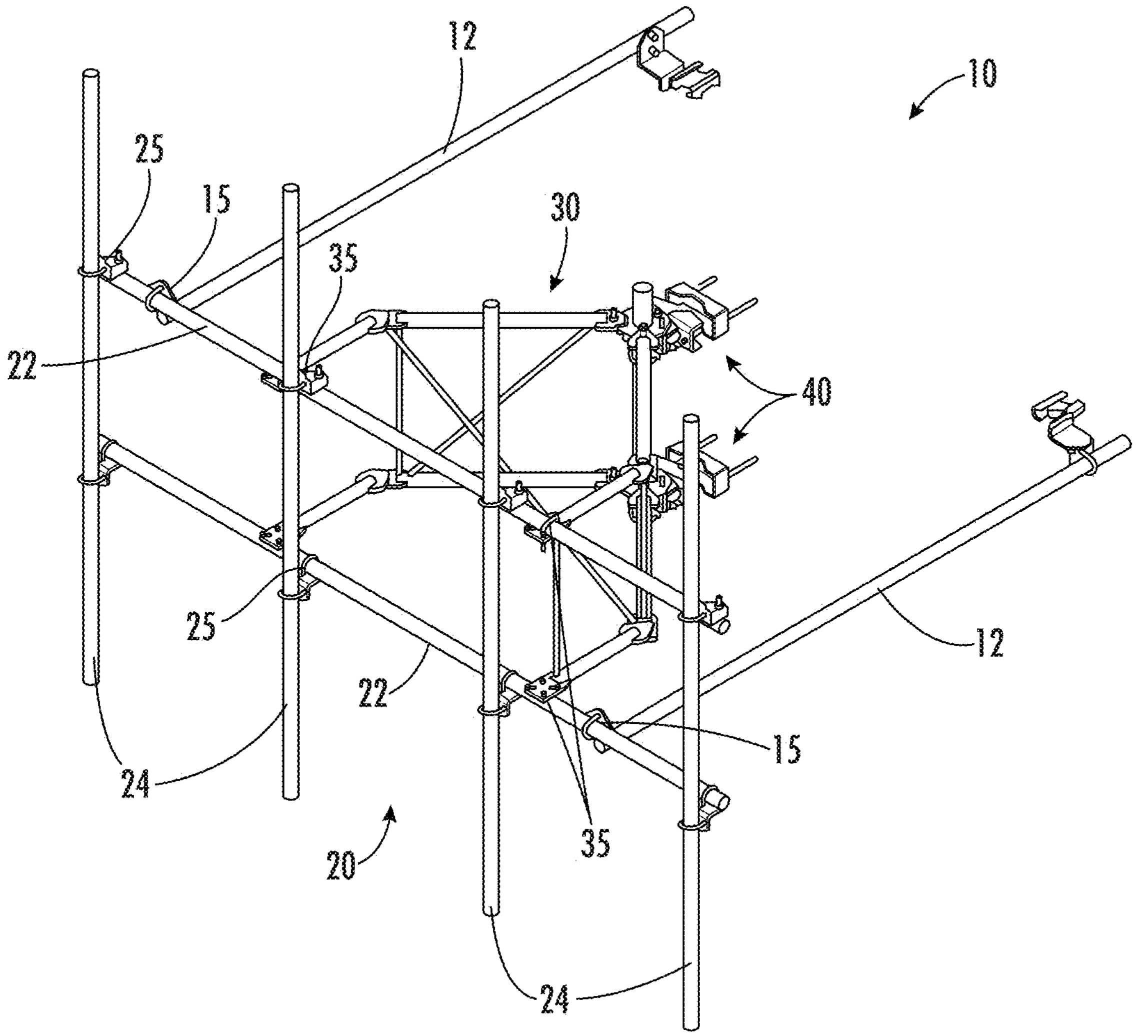
FIG. 1A (PRIOR ART)
FIG. 1A is a perspective view of a known sector frame antenna mount assembly.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10"').

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, offset adapters for vertical antenna mounting pipes and related antenna assemblies are provided. The offset adapters of the present invention allow for the mounting location of the vertical antenna mounting member (pipe) along the length of the horizontal members to be changed to address issues with respect to PIM or other spacing issues. The offset adapters of the present invention may be used on a new antenna mount or be retrofitted to an existing antenna mount. Embodiments of the present invention will now be discussed in greater detail with reference to FIGS. 2-13B.

Figure 1B:
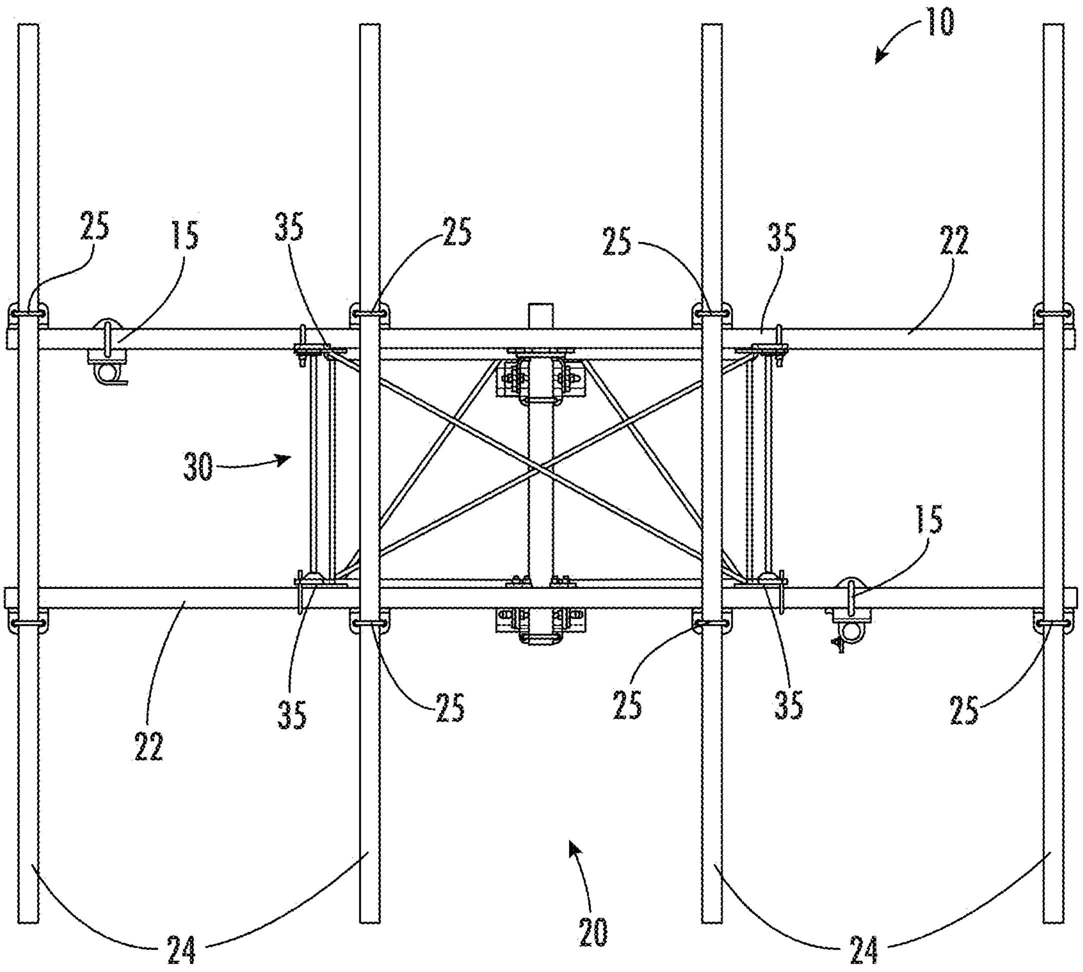
FIG. 1B (PRIOR ART)
FIG. 1B is a front view of the sector frame antenna mount assembly of FIG. 1A.
Figure 2:
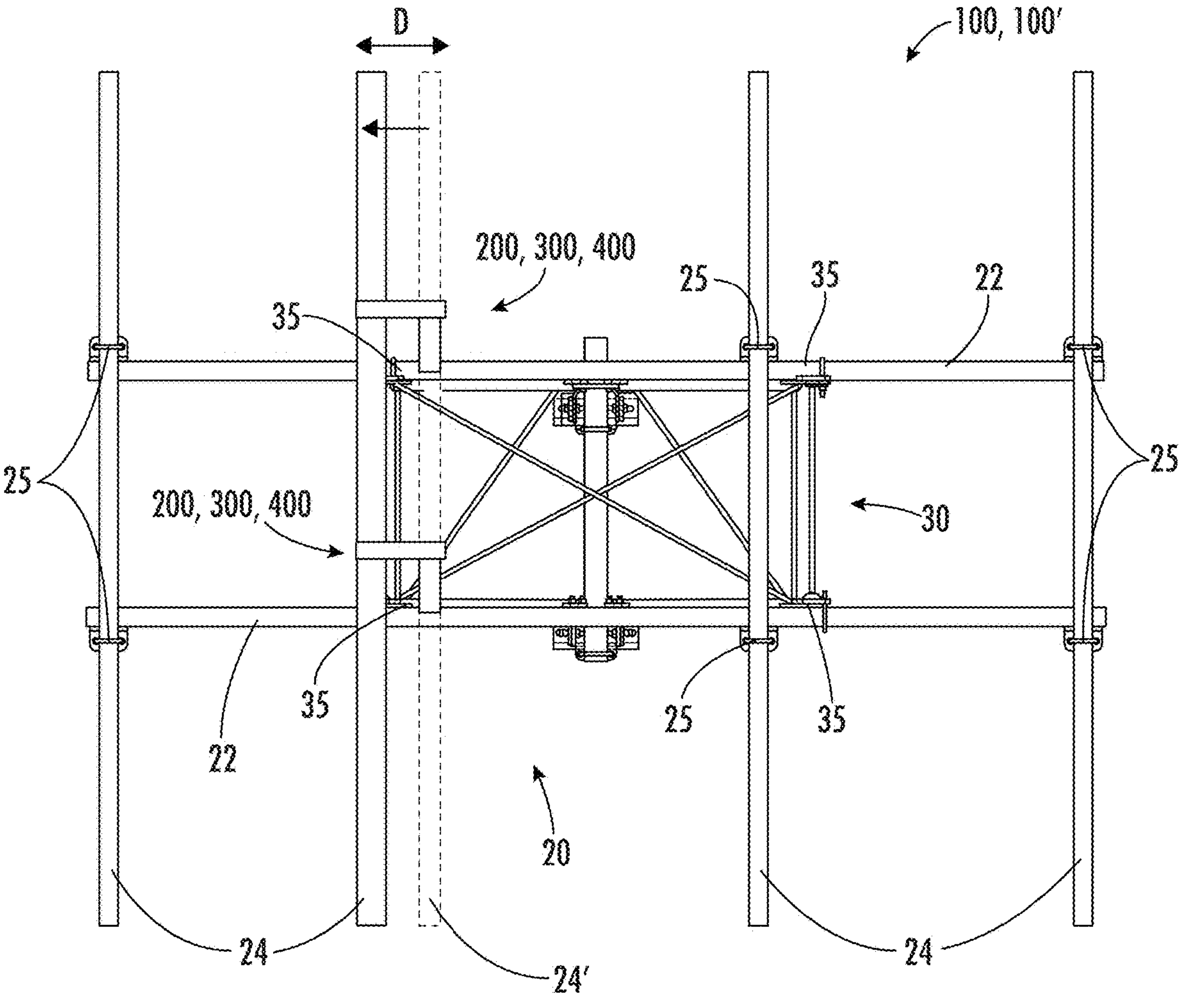
FIG. 2 is a front view of the sector frame antenna mount assembly of FIGS. 1A-1B utilizing an offset adapter to adjust the mounting location of an interior vertical pipe of the sector frame according to embodiments of the present invention.
Figure 3A:
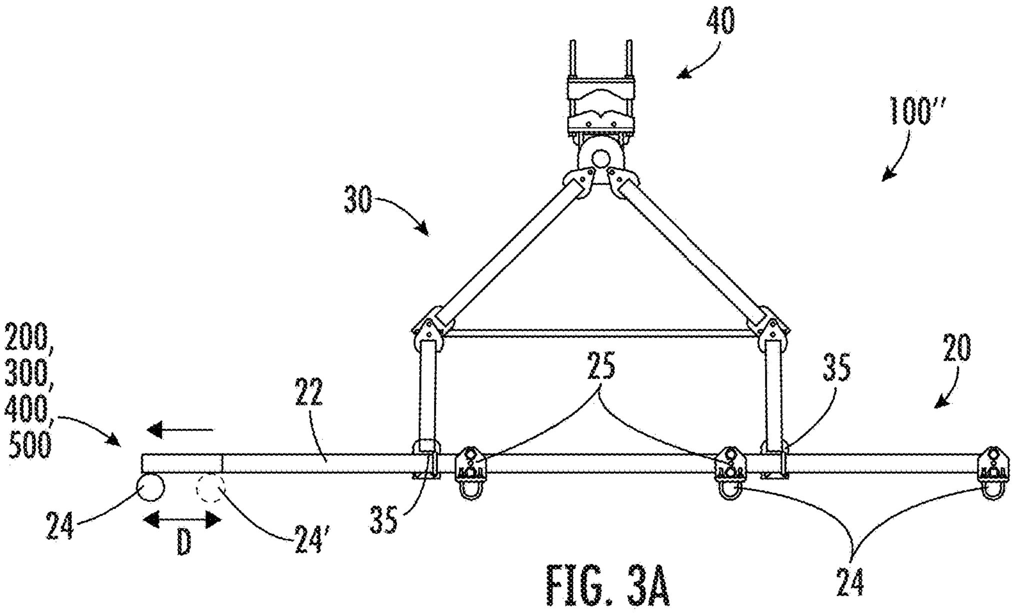
FIG. 3A is a top view of the sector frame antenna mount assembly of FIGS. 1A-1B utilizing an offset adapter to adjust the mounting location of an end vertical pipe of the sector frame according to embodiments of the present invention.
Figure 3B:
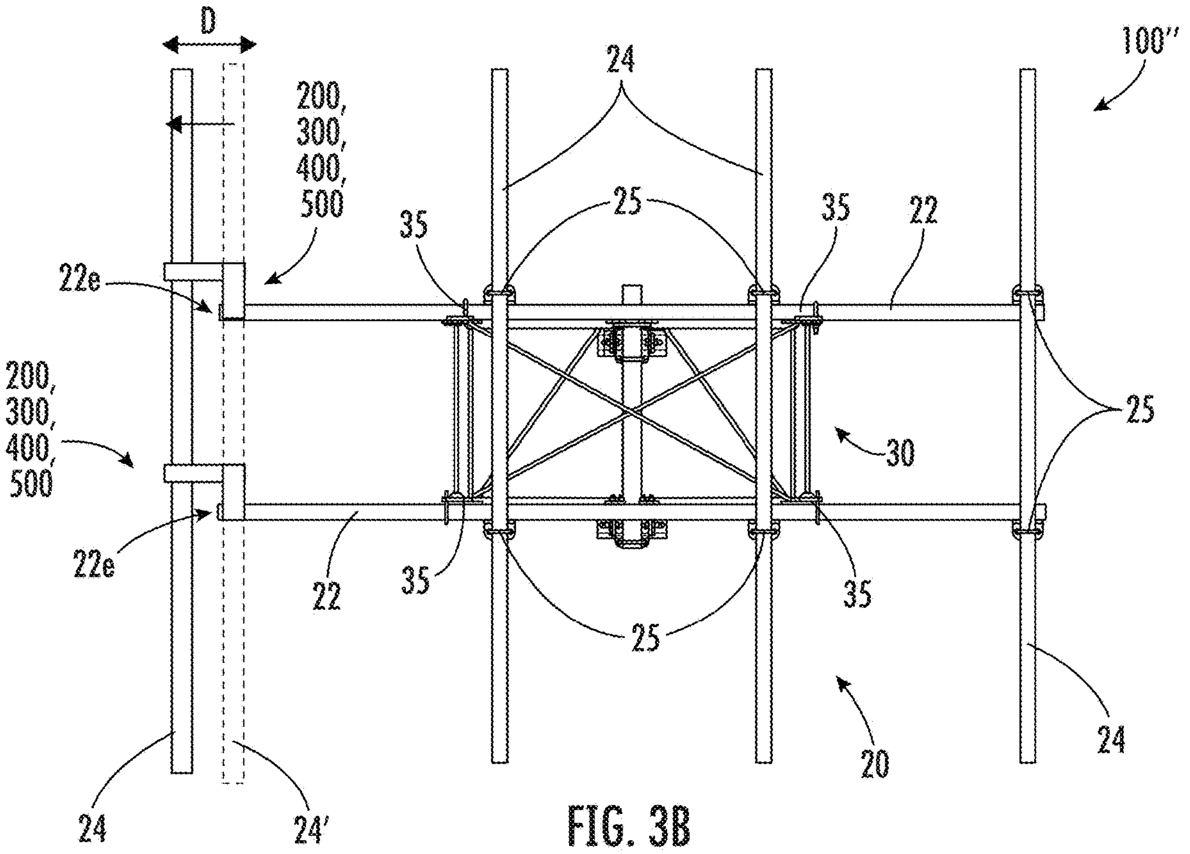
FIG. 3B is a front view of the sector frame antenna mount assembly of FIG. 3A.

Referring now to FIG. 2 and FIGS. 3A-3B, sector frame antenna mount assemblies 100, 100', 100" according to embodiments of the present invention are illustrated. Properties and/or features of the sector frame antenna mount assemblies 100, 100', 100" may be as described above in reference to the prior known sector frame antenna mount assembly 10 shown in FIGS. 1A-1B and duplicate discussion thereof may be omitted herein for the purposes of discussing FIG. 2 and FIGS. 3A-3B.

As shown in FIG. 2 and FIGS. 3A-3B, the sector frame antenna mount assemblies 100, 100', 100" according to embodiments of the present invention differ from prior known assemblies (e.g., the assembly 10 shown in FIGS. 1A-1B) in that the sector frame antenna mount assemblies 100, 100', 100" of the present invention include one or more offset adapters 200, 300, 400, 500 that are configured to move the mounting location of a respective vertical member (vertical antenna mounting pipe) 24 to a distance (i.e., to a new mounting location) along the length of the horizontal members (face pipes) 22 that was previously unavailable.

Figure 5A:
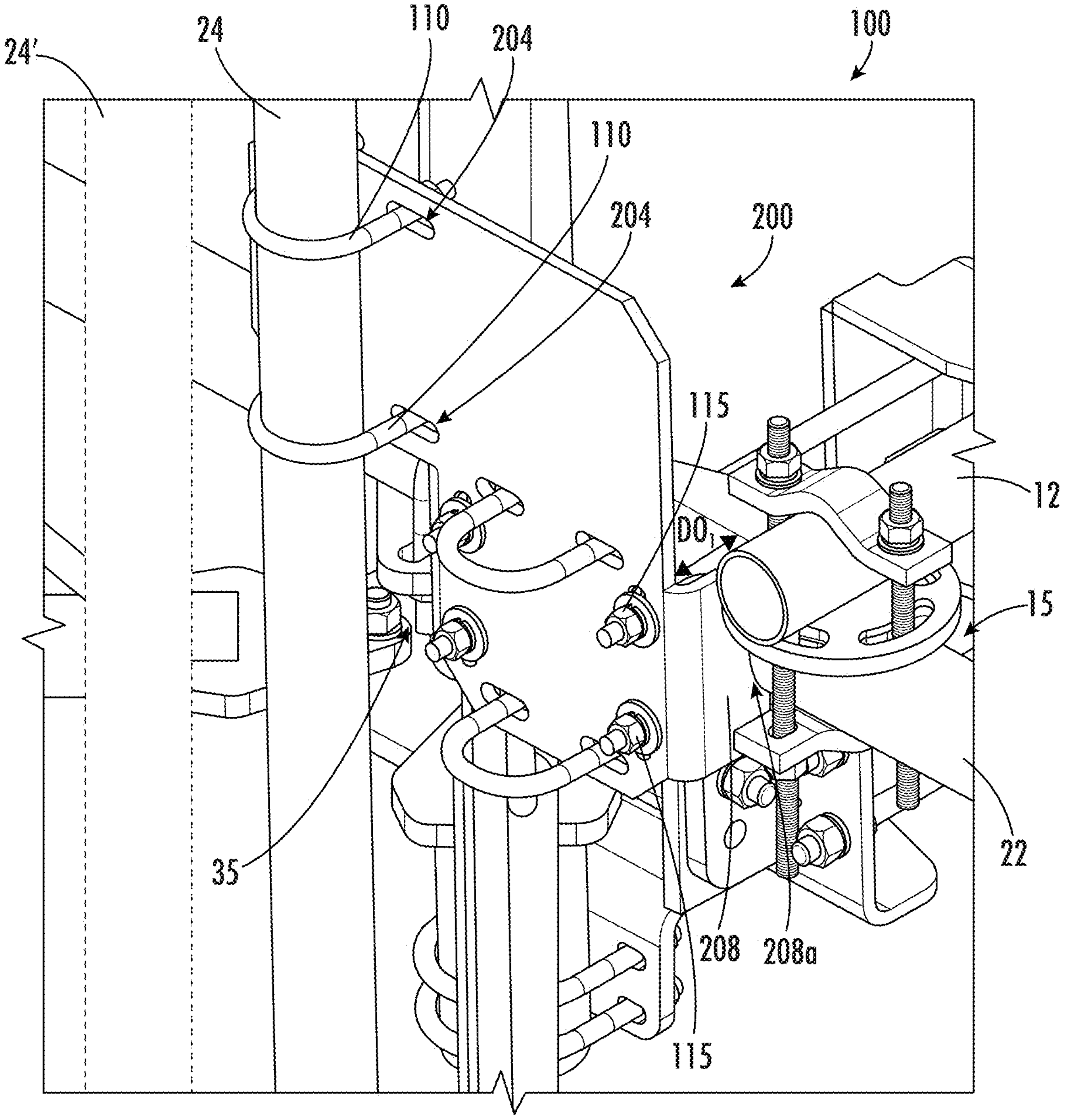
FIG. 5A is a partial view of the sector frame antenna mount assembly of FIG. 2 utilizing the offset adapter of FIGS. 4A-4D to adjust the mounting location of an interior vertical pipe of the sector frame according to embodiments of the present invention.
Figure 5B:
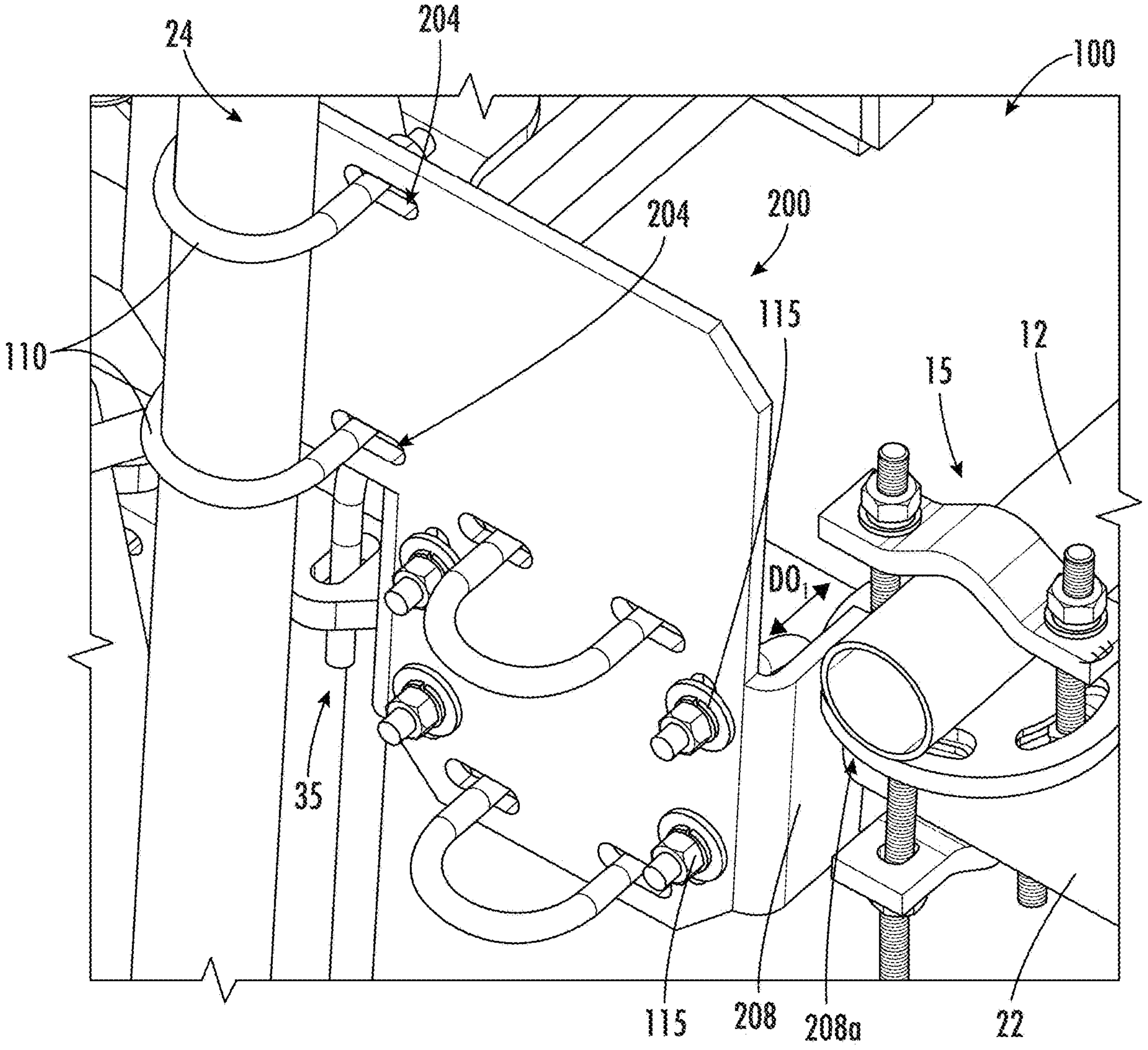
FIG. 5B is an enlarged view of the offset adapter in the sector frame antenna mount assembly of FIG. 5A.
Figure 7:
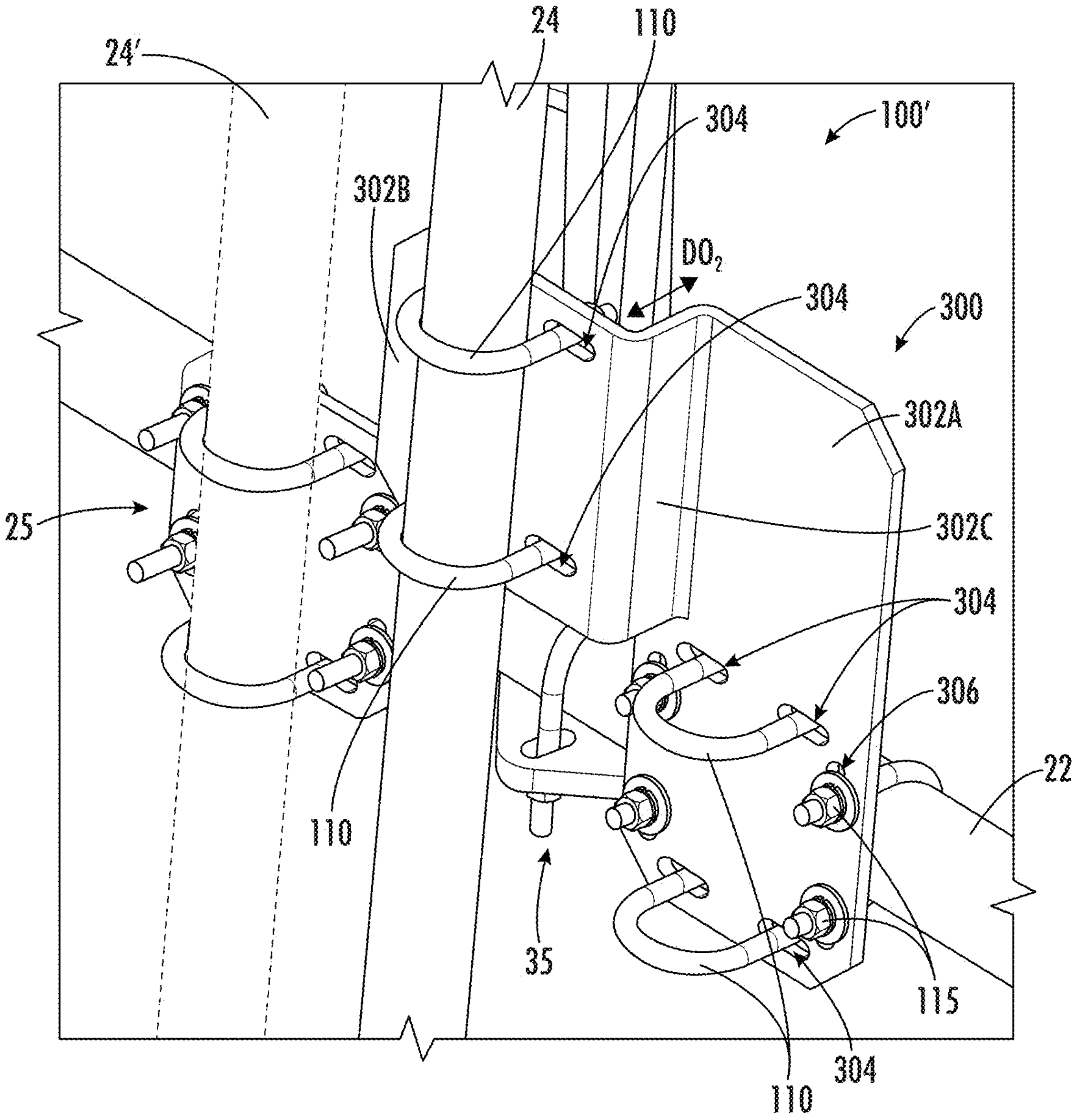
FIG. 7 is a partial view of the sector frame antenna mount assembly of FIG. 2 utilizing the offset adapter of FIGS. 6A-6C to adjust the mounting location of an interior vertical pipe of the sector frame according to embodiments of the present invention.

For example, as shown in FIG. 2, in some embodiments, the mounting location (position) of one or more of the interior vertical members 24 of the sector frame 20 may need to be changed (moved a distance D) because of issues with respect to passive intermodulation (PIM) or other spacing issues within the sector frame antenna mount assembly 100 (see also, e.g., FIGS. 5A-5B and FIG. 7). However, the desired mounting location of the vertical member 24 along the length of the horizontal members 22 may be obstructed by an existing mounting bracket or fastener secured to the horizontal members 22 (e.g., the mounting bracket 35 for the offset mount 30). As described in further detail below, in some embodiments, the offset adapters 200, 300, 400, 500 of the present invention are configured such that the mounting location of the respective interior vertical member 24 may be moved the desired distance D along the length of the horizontal member 22 (i.e., from where the vertical member 24' was previously secured) even if, in some instances, an obstruction (e.g., mounting bracket 35) interferes with the desired mounting location on the horizontal member 22.

Figure 10:
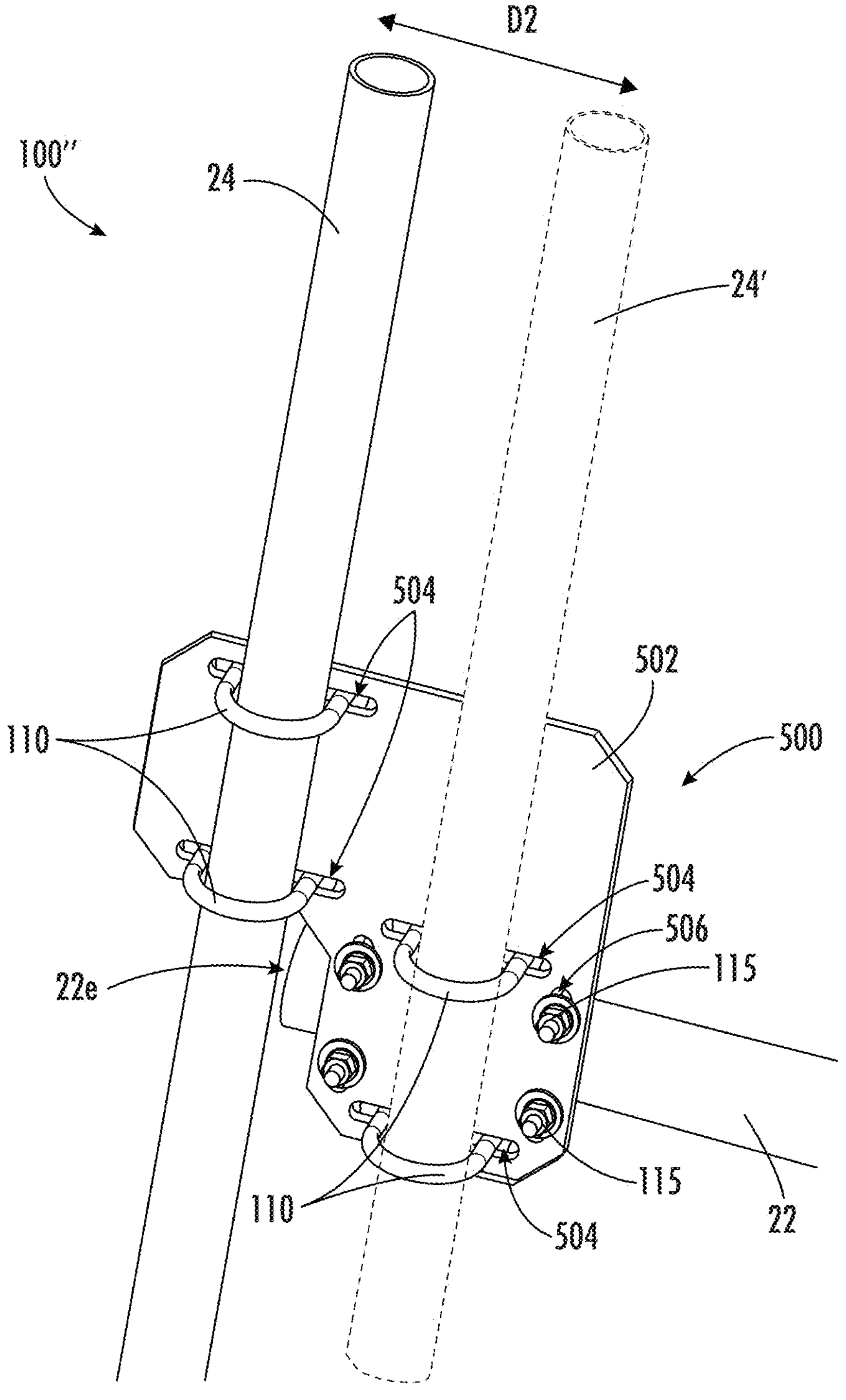
FIG. 10 is a partial view of the sector frame antenna mount assembly of FIGS. 3A-3B utilizing the offset adapter of FIG. 9 to adjust the mounting location of an end vertical pipe of the sector frame according to embodiments of the present invention.

Similarly, as shown in FIGS. 3A-3B, in some embodiments, the mounting location (position) of one or both of the end vertical members 24 of the sector frame 20 may need to be changed (moved a distance D) to a mounting location residing past an end **22*e* of the horizontal members 22 (see also, e.g., FIG. 10). As described in further detail below, in some embodiments, the offset adapters 200, 300, 400, 500 of the present invention are configured such that the mounting location of the respective end vertical member 24 may be moved the desired distance D to position the end vertical member 24 past the end 22*e* of the horizontal members 22. In some embodiments, the offset adapters 200, 300, 400, 500 of the present invention are configured to move the respective vertical member 24 a distance D (i.e., from the prior mounting location of the vertical members 24'**) in a range of between about 2 inches and about 12 inches, typically about 6 inches.

Referring now to FIGS. 4A-4D and FIGS. 5A-5B, an offset adapter 200 according to embodiments of the present invention is illustrated. In some embodiments, the offset adapter 200 may be used to change the mounting location of an interior vertical member 24 along the length of the horizontal members 22 (see, e.g., FIG. 2 and FIGS. 5A-5B). In other embodiments, the offset adapter 200 may be used to change mounting location of an end vertical member 24 to such that the vertical member 24 it positioned past the ends **22*e* of the horizontal members 22 (see, e.g., FIGS. 3A-3**B).

As shown in FIGS. 4A-4D, the offset adapter 200 may have a generally L-shaped main body 202 having a height $H_1$, an overall width $W_{1A}$, and a thickness $T_1$. The main body 202 has a first outer surface **202*a* and a second opposing outer surface 202*b*. In some embodiments, the main body 202 of the offset adapter 200** has a height $H_1$ in a range of between about 8 inches and about 24 inches, an overall width $W_{1A}$ in a range of between about 10 inches and about 24 inches, and a thickness $T_1$ in a range of between about 0.06 inches and about 0.50 inches.

Figure 4A:
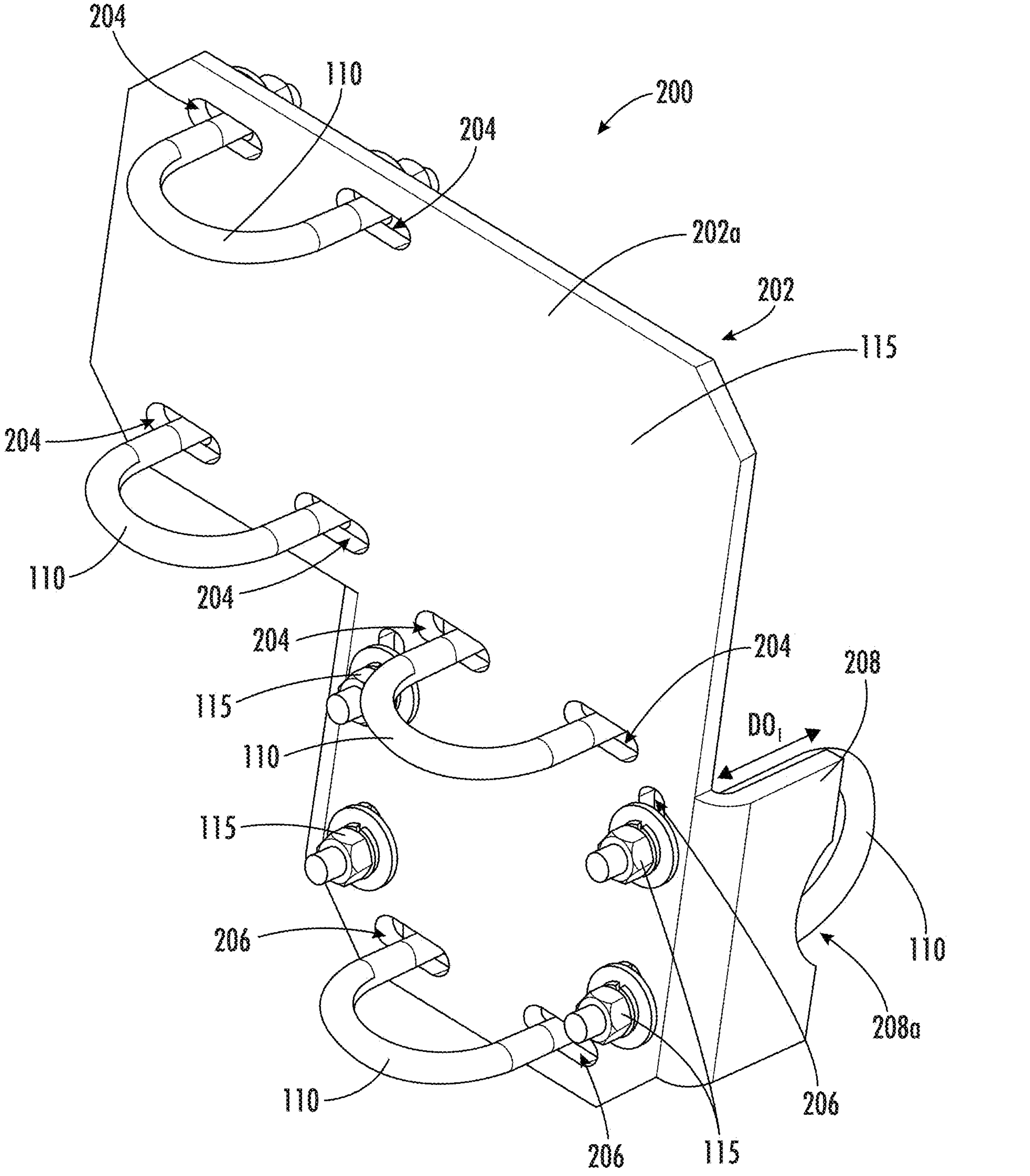
FIG. 4A is a front perspective view of an offset adapter according to embodiments of the present invention.
Figure 4B:
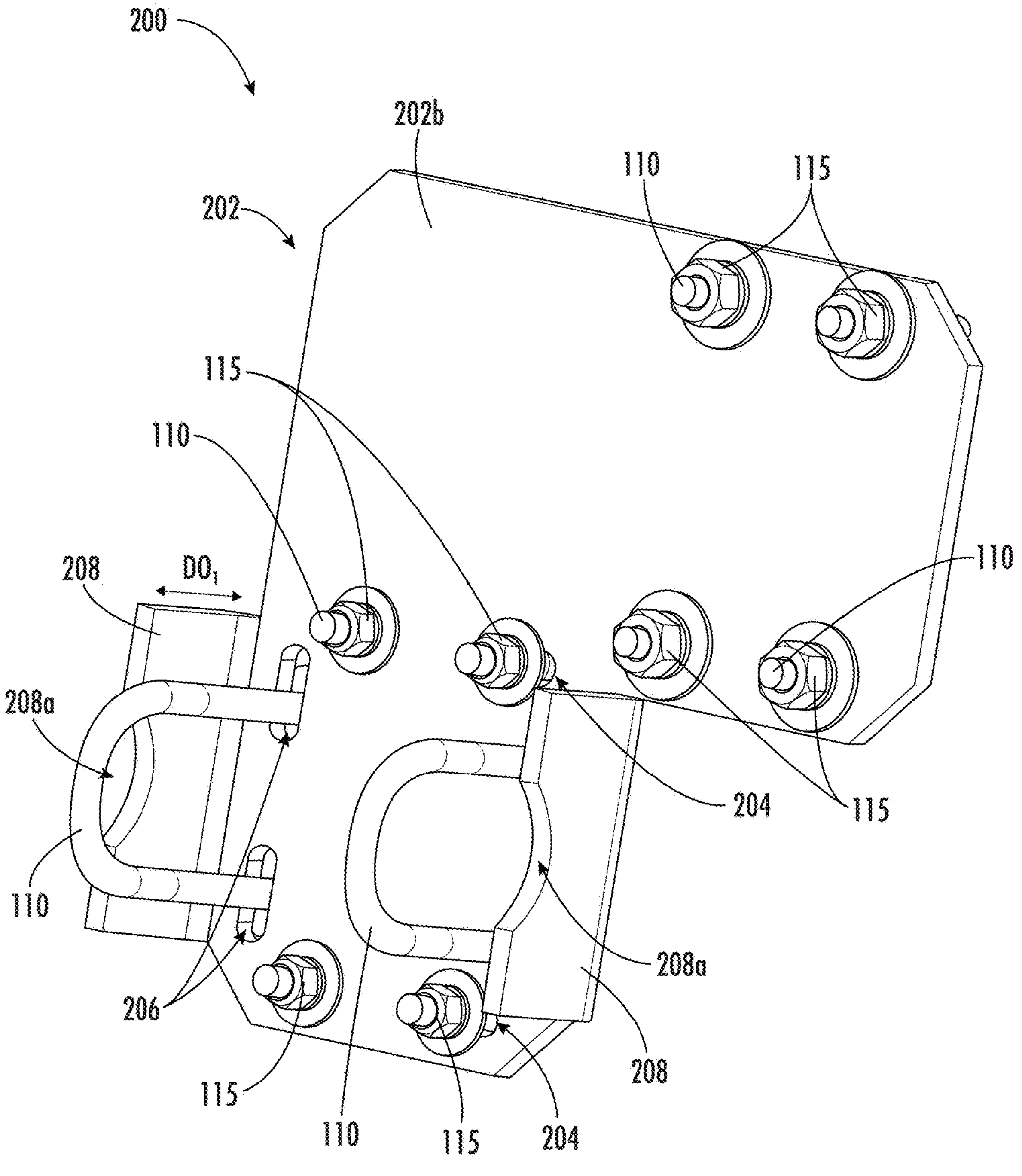
FIG. 4B is a rear perspective view of the offset adapter of FIG. 4A.
Figure 4C:
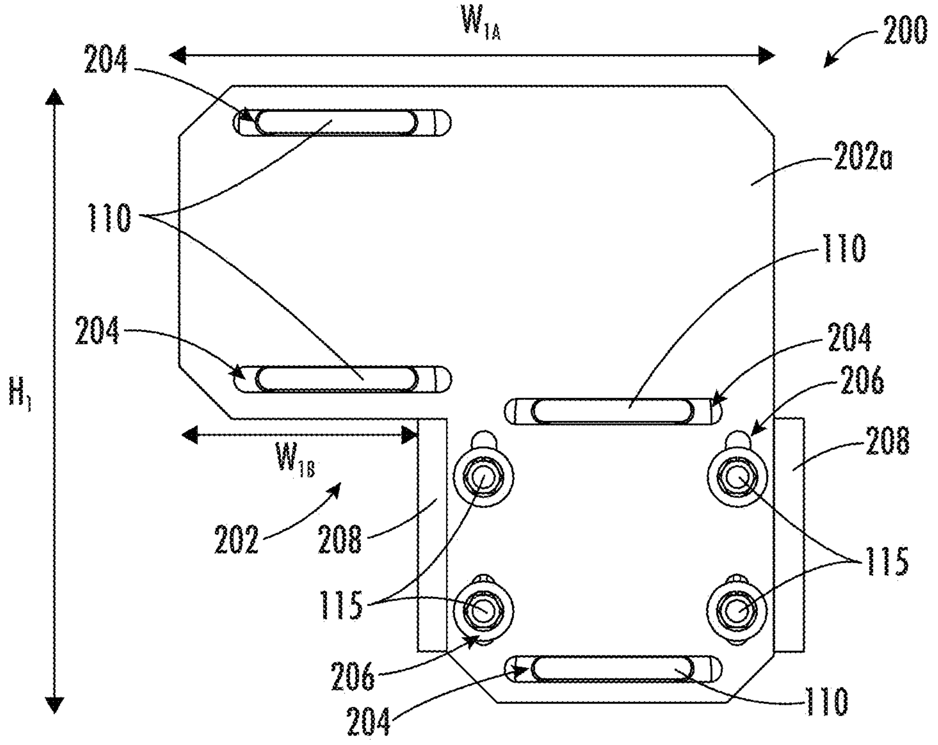
FIG. 4C is a front view of the offset adapter of FIG. 4A.
Figure 4D:
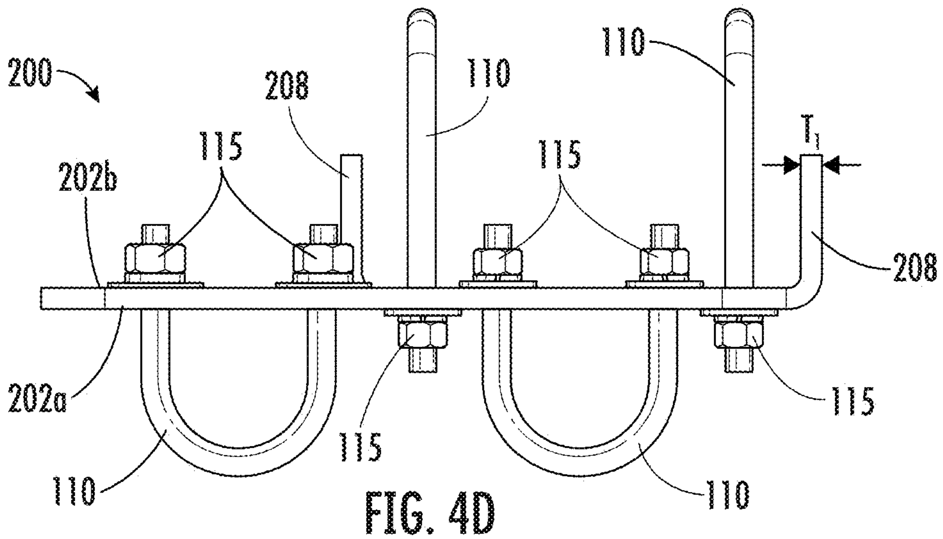
FIG. 4D is a top view of the offset adapter of FIG. 4A.

The main body 202 comprises a plurality of apertures 204, 206. As shown in FIGS. 4A-4C, some of the apertures 204 are elongated horizontally (i.e., relative to the width $W_{1A}$ of the main body 202) and some of the apertures 206 are elongated vertically (i.e., relative to the height $H_1$ of the main body 202). Each of the apertures 204, 206 are configured to receive a fastener 110. In some embodiments, the fastener 110 is a U-bolt and a pair of adjacent apertures 204, 206 are each configured to receive a portion of the U-bolt (i.e., fastener 110). In some embodiments, an alternative fastener 110' may be used (see, e.g., FIG. 11). The fasteners 110 are secured to the main body 202 of the offset adapter 200 via corresponding securing mechanisms 115 (e.g., washers and nuts). The fasteners 110 are configured to engage a respective horizontal or vertical member 22, 24 to secure to the offset adapter 200 thereto. The elongated apertures 204, 206 allow for some flexibility for the positioning of the fasteners 110 therethrough with respect to the corresponding horizontal or vertical members 22, 24 and/or to accommodate different size fasteners 110. For example, as shown in FIGS. 4A-4D, in some embodiments, the offset adapter 200 includes at least two fasteners 110 that are inserted through horizontally elongated apertures 204 and are configured to engage a vertical member 24 and at least two fasteners 110 that are inserted through vertically elongated apertures 206 and are configured to engage a horizontal member 22 (see also, e.g., FIGS. 5A-5B). Optionally, in some embodiments, the offset adapter 200 includes at least two additional fasteners 110 that are inserted through horizontally elongated apertures 204 and are configured to engage an additional vertical member 24, if needed.

In some embodiments, at least two of the fasteners 110 (i.e., the "U" portion of the U-bolt) extend outwardly from the first (front) outer surface 202*a* of the main body 202 to engage a vertical member 24 and the securing mechanism 115 contacts the second (back) outer surface 202*b* to secure the fastener 110 (and vertical member 24) to the main body 202. In some embodiments, at least two of the fasteners 110 (i.e., the "U" part of the U-bolt) extend outwardly from the second (back) outer surface 202*b* of the main body 202 to engage a horizontal member 22 and the securing mechanisms 115 contacts the first (front) outer surface 202*a* to secure the fastener 110 (and horizontal member 22) to the main body 202. Optionally, in some embodiments, at least four of the fasteners 110 (i.e., the "U" part of the U-bolt) extend outwardly from the first (front) outer surface 202*a* of the main body 202 to engage two vertical members 24 and the securing mechanism 115 contacts the second (back) outer surface 202*b* to secure the fastener 110 (and vertical members 24) to the main body 202. As noted above, alternative fasteners (i.e., other than U-bolts) may be used to secure the horizontal and vertical members 22, 24 to the offset adapter 200 (see, e.g., FIG. 11).

In some embodiments, the offset adapter 200 may further comprise a pair of spaced-apart flanges 208 extending outwardly from the main body 202 of the adapter 200 (e.g., from the second (back) outer surface 202*b*). In some embodiments, the flanges 208 extend a distance $DO_1$ from the main body 202 in a range of between about 1 inches and about 6 inches. In some embodiments, the flanges 208 are spaced apart a distance or width $W_{1B}$ in a range of between about 6 inches and about 12 inches. As discussed in further detail below, the flanges 208 help to position (i.e., offset) the main body 202 of the offset adapter 200 away from (i.e., distance $DO_1$) the horizontal member 22 and any obstruction (s) that may reside at the desired mounting location on horizontal member 22, for example, a mounting bracket or fastener 15, 25, 35 (see, e.g., FIGS. 5A-5B). As shown FIGS. 4A-4B, in some embodiments, each flange 208 may comprise an arcuate (concave) recess 208*a*. The arcuate recesses 208*a* may be sized and configured to receive at least a portion of the respective horizontal member 22 to help maintain contact between the offset adapter 200 and the horizontal member 22 and help secure the offset adapter 200 to the horizontal member 22.

Referring to FIGS. 5A-5B, a sector frame mount assembly 100 according to embodiments of the present invention is illustrated which utilizes the offset adapter 200 described herein. As shown in FIGS. 5A-5B, the offset adapter 200 allows the mounting location of the vertical member 24 to be repositioned and secured on the horizontal member 22 even though a mounting bracket 35 is already secured to the horizontal member 22 at the desired mounting location. The flanges 208 of the offset adapter 200 are configured to position the main body 202 of the adapter 200 a distance $DO_1$ from the horizontal member 22 and mounting bracket 35 securing thereto, thereby allowing the vertical member 24 to be secured on the horizontal member 22 at the desired location (i.e., a distance D from the prior mounting position of vertical member 24') to address issues with respect to PIM or other spacing issues. The offset adapter 200 allows these PIM or spacing issues to be easily addressed without having to make any other changes to the sector frame mount assembly 100, thereby also reducing costs. It is noted that while FIGS. 5A-5B illustrate the offset adapter 200 being used to reposition the mounting location of an interior vertical member 24 along the length of the horizontal member 22, as noted above, it would be understood by a person of ordinary skill in the art that the offset adapter 200 of the present invention may also be used such that the mounting location of an end vertical member 24 may be repositioned to a location residing past an end 22*e* of the horizontal member 22 (i.e., as shown in FIGS. 3A-3B).

Referring now to FIGS. 6A-6D and FIG. 7, another offset adapter 300 according to embodiments of the present invention is illustrated. In some embodiments, the offset adapter 300 may be used to change the mounting location of an interior vertical member 24 along the length of the horizontal members 22 (see, e.g., FIG. 2 and FIG. 7). In other embodiments, the offset adapter 300 may be used to change the mounting location of an end vertical member 24 to such that the vertical member 24 resides past the ends 22*e* of the horizontal members 22 (see, e.g., FIGS. 3A-3B). Properties and/or features of the offset adapter 300 may be as described above in reference to the offset adapter 200 shown in FIGS. 4A-4D and FIGS. 5A-5B, and duplicate discussion thereof may be omitted herein for the purposes of discussing FIGS. 6A-6D and FIG. 7. As described in further detail below, the offset adapter 300 differs from the offset adapter 200 described herein in that instead of including a pair of spaced-apart flanges 208, the main body 302 of the offset adapter 300 includes a transition section 302C such that, when the offset adapter 300 is secured to the horizontal member 22, at least a portion (i.e., second section 302B) of the main body 302 is positioned a distance $DO_2$ (i.e., offset) from the horizontal member 22.

As shown in FIGS. 6A-6D, the offset adapter 300 may have a generally L-shaped main body 302 having a height $H_2$, an overall width $W_{2A}$, and a thickness $T_2$. The main body 302 includes a first section 302A coupled to a second section 302B by a transition section 302C. The second section 302B extends from the first section 302A a distance or width $W_{2B}$. The transition section 302C positions the second section 302B on a second plane P2 that is offset (i.e., by a distance $DO_2$) and parallel to a first plane P1 of the first section 302A. In some embodiments, the main body 302 of the offset adapter 300 has a height $H_2$ in a range of between about 8 inches and about 24 inches, an overall width $W_{2A}$ in a range of between about 10 inches and about 24 inches, and a thickness $T_2$ in a range of between about 0.06 inches and about 0.50 inches. In some embodiments, the second section 302B extends from the first section 302A a distance or width $W_{2B}$ in a range of between about 6 inches and about 12 inches. In some embodiments, the second section 302B is offset from the first section 302A a distance $DO_2$ in a range of between 0.5 inches and about 6 inches (i.e., distance between the first plane P1 and the second plane P2).

Figure 6A:
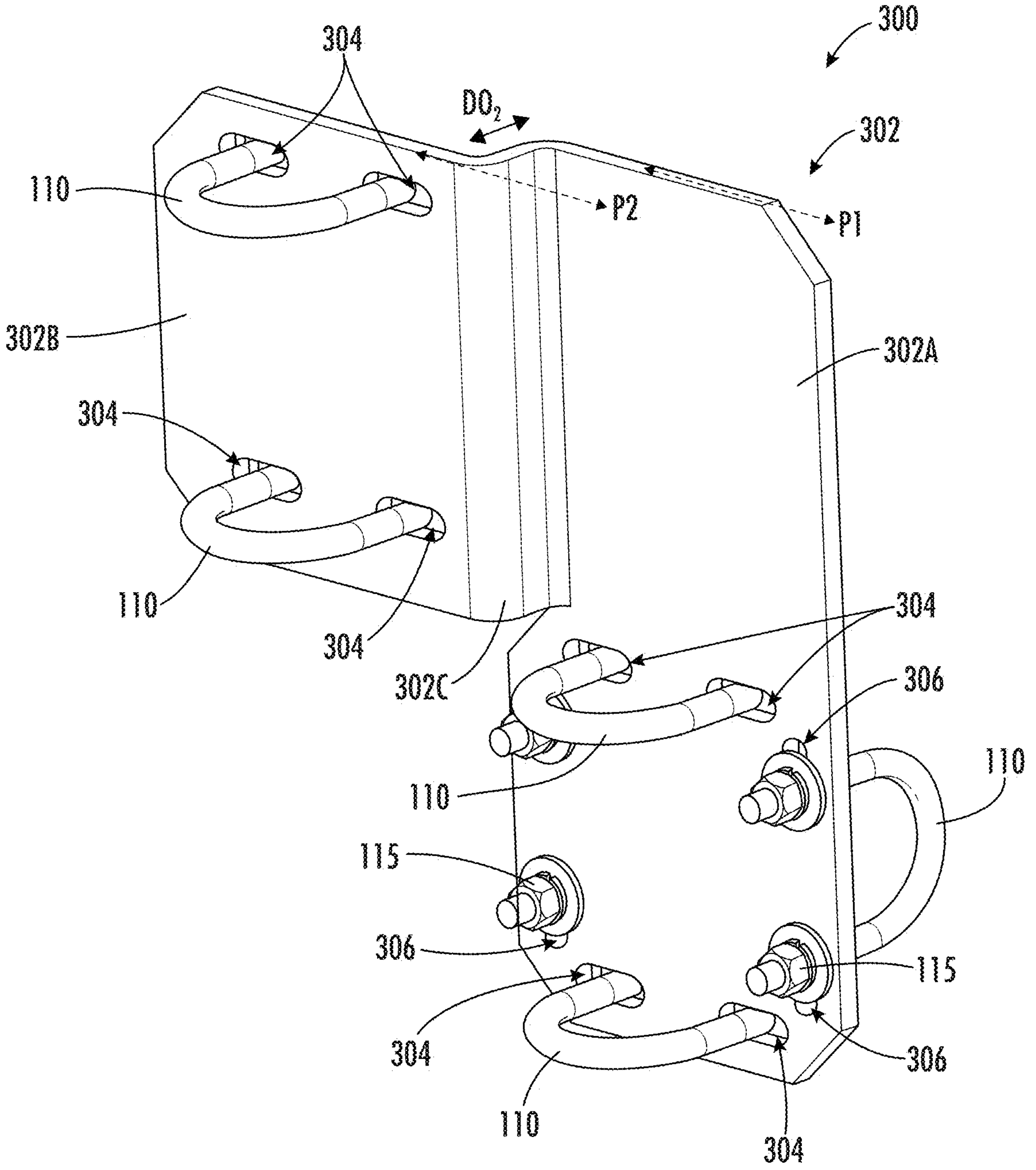
FIG. 6A is a front perspective view of another offset adapter according to embodiments of the present invention.
Figure 6B:
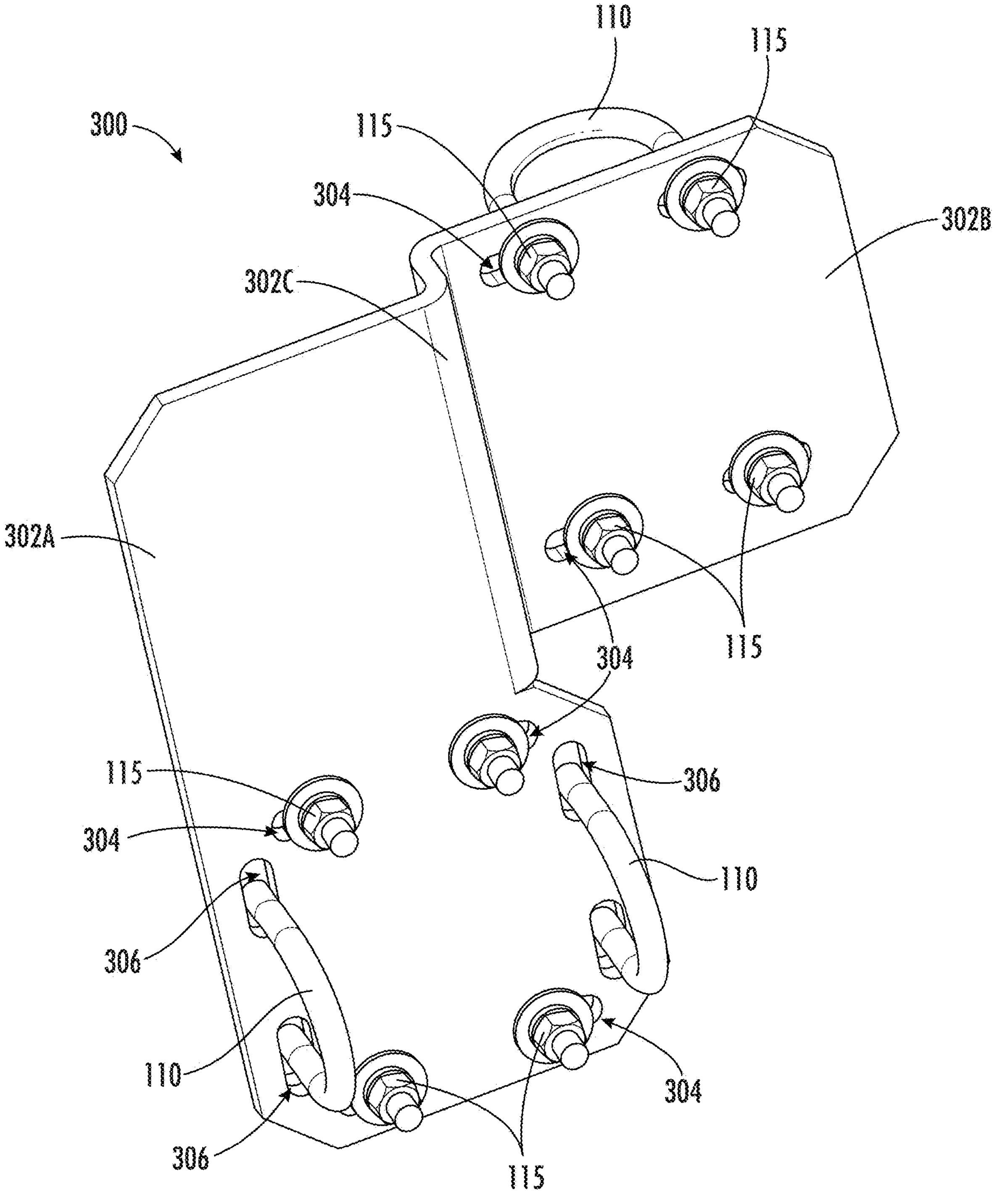
FIG. 6B is a rear perspective view of the offset adapter of FIG. 6A.
Figure 6C:
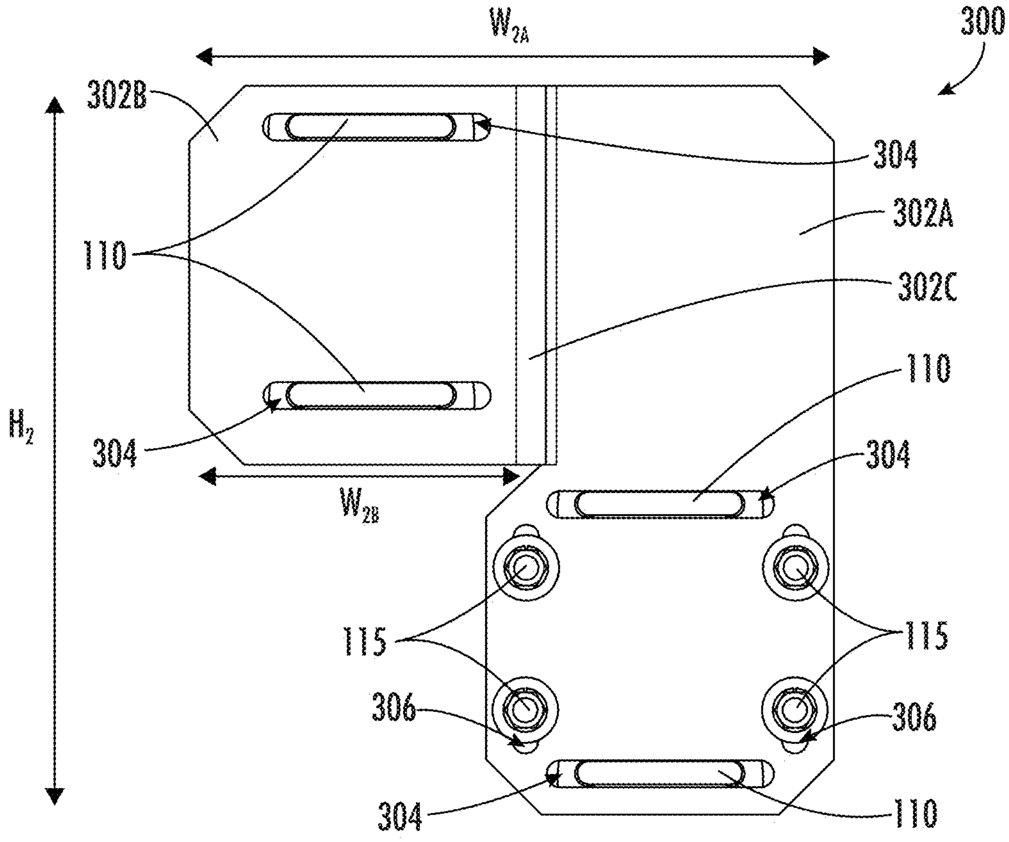
FIG. 6C is a front view of the offset adapter of FIG. 6A.
Figure 6D:
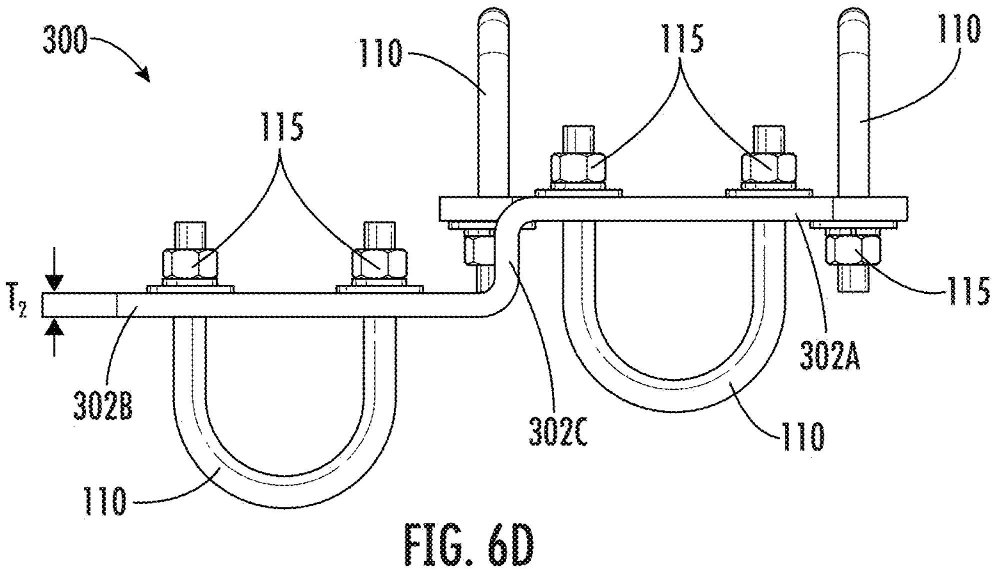
FIG. 6D is a top view of the offset adapter of FIG. 6A.

Similar to the offset adapter 200 described herein, the main body 302 of the offset adapter 300 comprises a plurality of apertures 304, 306. As shown in FIGS. 6A-6C, some of the apertures 304 are elongated horizontally (i.e., relative to the width $W_{2A}$ of the main body 302) and some of the apertures 306 are elongated vertically (i.e., relative to the height $H_2$ of the main body 302). Each of the apertures 304, 306 are configured to receive a fastener 110. In some embodiments, the fastener 110 is a U-bolt and a pair of adjacent apertures 304, 306 are each configured to receive a portion of the U-bolt (i.e., fastener 110). The fasteners 110 are configured to engage a respective horizontal or vertical member 22, 24 to secure the offset adapter 300 thereto. The elongated apertures 204, 206 allow for some flexibility for the positioning the fasteners 110 therethrough with respect to the corresponding horizontal or vertical members 22, 24 and/or to accommodate different size fasteners 110. For example, as shown in FIGS. 6A-6C, in some embodiments, the offset adapter 300 includes at least four fasteners 110 that are inserted through horizontally elongated apertures 304 and are configured to engage a vertical member 24 and at least two fasteners 110 that are inserted through vertically elongated apertures 306 and configured to engage a horizontal member 22 (see also, e.g., FIG. 7). In some embodiments, four fasteners 110 may be inserted through apertures 304, 306 in the first section 302A of the main body 302 (two fasteners 110 configured to engage a vertical member 24 and two fasteners 110 configured to engage a horizontal member 22) and two of the fasteners 110 configured to engage a vertical member 24 may be inserted through apertures 304 in the second section 302B of the main body 302. It is noted that, in some embodiments, the two fasteners 110 configured to engage a vertical member 24 in the first section 302A may be optional. Similar to offset adapter 200, it is noted that alternative fasteners (i.e., other than U-bolts) may be used to secure the horizontal and vertical members 22, 24 to the offset adapter 300 (see, e.g., FIG. 11).

Referring to FIG. 7, a sector frame mount assembly 100' according to embodiments of the present invention is illustrated which utilizes the offset adapter 300 described herein. As shown in FIG. 7, to address issues with respect to PIM or other spacing issues within the sector frame mount assembly 100', the offset adapter 300 allows the mounting location of the vertical member 24 to be repositioned and secured on the horizontal member 22 even though a mounting bracket 35 is already secured to the horizontal member 22 at the desired mounting location. The transition section 302C of the main body 302 of the offset adapter 300 positions a portion of the main body 202 (i.e., second section 302B) a distance $DO_2$ from the horizontal member 22 which allows the vertical member 24 to be secured on the horizontal member 22 at the desired mounting location even though a mounting bracket 35 is secured to the horizontal member 22 at the same location. It is noted that while FIG. 7 illustrates the offset adapter 300 being used to move the mounting location of an interior vertical member 24 along the length of the horizontal member 22, similar to offset adapter 200, it would be understood by a person of ordinary skill in the art that the offset adapter 300 of the present invention may also be used such that the mounting location of an end vertical member 24 may be repositioned to reside past an end 22*e* of the horizontal member 22 (i.e., as shown in FIGS. 3A-3B).

Figure 8:
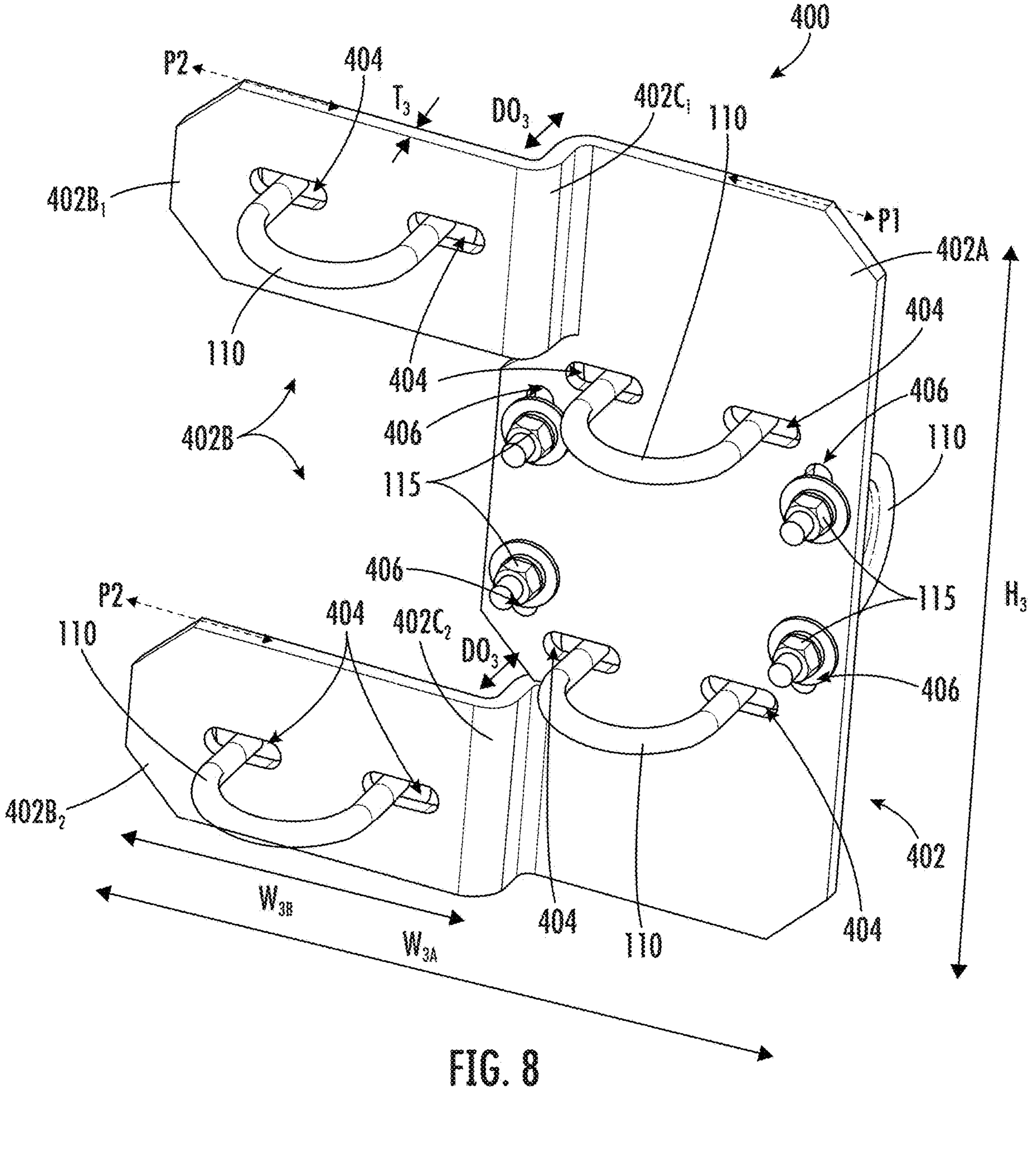
FIG. 8 is a front perspective view of another offset adapter according to embodiments of the present invention.

Referring now to FIG. 8, another offset adapter 400 according to embodiments of the present invention is illustrated. In some embodiments, the offset adapter 400 may be used to change the mounting location of an interior vertical member 24 along the length of the horizontal members 22 (see, e.g., FIG. 2). In other embodiments, the offset adapter 400 may be used to change the mounting location of an end vertical member 24 to such that the vertical member 24 resides past the ends 22*e* of the horizontal members 22 (see, e.g., FIGS. 3A-3B). Properties and/or features of the offset adapter 400 may be as described above in reference to the offset adapter 300 shown in FIGS. 6A-6D and FIG. 7, and duplicate discussion thereof may be omitted herein for the purposes of discussing FIG. 8. As described in further detail below, the offset adapter 400 differs from the offset adapter 300 described herein in that the second (offset) section 402B of the main body 402 is divided into two separate arm sections 402$B_1$, 402$B_2$ such that, when the offset adapter 400 is secured to the horizontal member 22, each of the arm sections 402$B_1$, 402$B_2$ are positioned a distance $DO_3$ (i.e., offset) from the horizontal member 22 and configured to secure a vertical member 24 to the offset adapter 400.

As shown in FIG. 8, the offset adapter 400 may have a generally C-shaped main body 402 having a height $H_3$, an overall width $W_{3A}$, and a thickness $T_3$. The main body 402 includes a main section 402A coupled to a pair of arm sections 402$B_1$, 402$B_2$ by respective transition sections 402$C_1$, 402$C_2$. The arm sections 402$B_1$, 402$B_2$ extend outwardly from the main section 402A a distance or width $W_{3B}$. The transition sections 402$C_1$, 402$C_2$ are configured to position the pair of arm sections 402$B_1$, 402$B_2$ on a second plane P2 that is offset (i.e., distance $DO_3$) from and parallel to a first plane P1 of the main section 402A. In some embodiments, the main body 402 of the offset adapter 400 has a height $H_3$ in a range of between about 8 inches and about 24 inches, an overall width $W_{3A}$ in a range of between about 10 inches and about 24 inches, and a thickness $T_3$ in a range of between about 0.06 inches and about 0.50 inches. In some embodiments, the arm sections 402$B_1$, 402$B_2$ extend from the main section 402A a distance or width $W_{3B}$ in a range of between about 6 inches and about 20 inches. In some embodiments, the pair of arm sections 402$B_1$, 402$B_2$ are offset from the main section 402A a distance $DO_3$ in a range of between 0.5 inches and about 6 inches (i.e., distance between the first plane P1 and the second plane P2).

Similar to the offset adapter 400 described herein, the main body 402 of the offset adapter 400 comprises a plurality of apertures 404, 406. As shown in FIG. 8, some of the apertures 404 are elongated horizontally (i.e., relative to the width $W_{3A}$ of main body 402) and some of the apertures 406 are elongated vertically (i.e., relative to the heigh $H_3$ of main body 402). Each of the apertures 404, 406 are configured to receive a fastener 110. In some embodiments, the fastener 110 is a U-bolt and a pair of adjacent apertures 404, 406 are each configured to receive a portion of the U-bolt (i.e., fastener 110). The fasteners 110 are configured to engage a respective horizontal or vertical member 22, 24 to secure the offset adapter 400 thereto. The elongated apertures 404, 406 allow for some flexibility for the positioning the fasteners 110 therethrough with respect to the corresponding horizontal or vertical members 22, 24 and/or to accommodate different size fasteners 110.

As shown in FIG. 8, in some embodiments, each of the arm sections 402$B_1$, 402$B_2$ of the offset adapter 400 have one or more fasteners 110 (see also, e.g., FIG. 11) inserted through a pair of horizontally elongated apertures 404 that are configured to engage a vertical member 24. The main section 402A of the offset adapter 400 includes at least two fasteners 110 that are inserted through vertically elongated apertures 306 and configured to engage a horizontal member 22. In some embodiments, the main section 402A of the offset adapter 400 may include four fasteners 110 (i.e., U-bolts) that are inserted through apertures 404, 406 in the main section 402A (two fasteners 110 configured to engage a vertical member 24 and two fasteners 110 configured to engage for a horizontal member 22). It is noted that, in some embodiments, the two fasteners 110 configured to engage a vertical member 24 in the main section 302A may be optional. Similar to offset adapters 200, 300, it is noted that alternative fasteners (i.e., other than U-bolts) may be used to secure the horizontal and vertical members 22, 24 to the offset adapter 400 (see, e.g., FIG. 11).

A sector frame mount assembly which utilizes the offset adapter 400 of the present invention would be similar to the sector frame mount assembly 100' described herein (see, e.g., FIG. 7 which illustrates the assembly 100' using the offset adapter 300). The offset adapter 400 allows the mounting location of the vertical member 24 to be repositioned and secured on the horizontal member 22 even though a mounting bracket 35 may be already secured to the horizontal member 22 at the desired mounting location. The transition sections 402$C_1$, 402$C_2$ of the main body 402 of the offset adapter 400 position the pair of arm sections 402$B_1$, 402$B_2$ a distance $DO_3$ from the horizontal member 22 to allow a vertical member 24 to be secured on the horizontal member 22 at the desired mounting location even though a mounting bracket 35 (or other obstruction) may be secured to the horizontal member 22 at the same location. Thus, the offset adapter 400 allows a technician to move the mounting location of a vertical member 24 along the length of the horizontal member 22 to address issues with respect to PIM or other spacing issues within the sector frame mount assembly 100' without having to make additional changes to the sector frame 20 or components thereof (e.g., mounting brackets 15, 25, 35).

Figure 9:
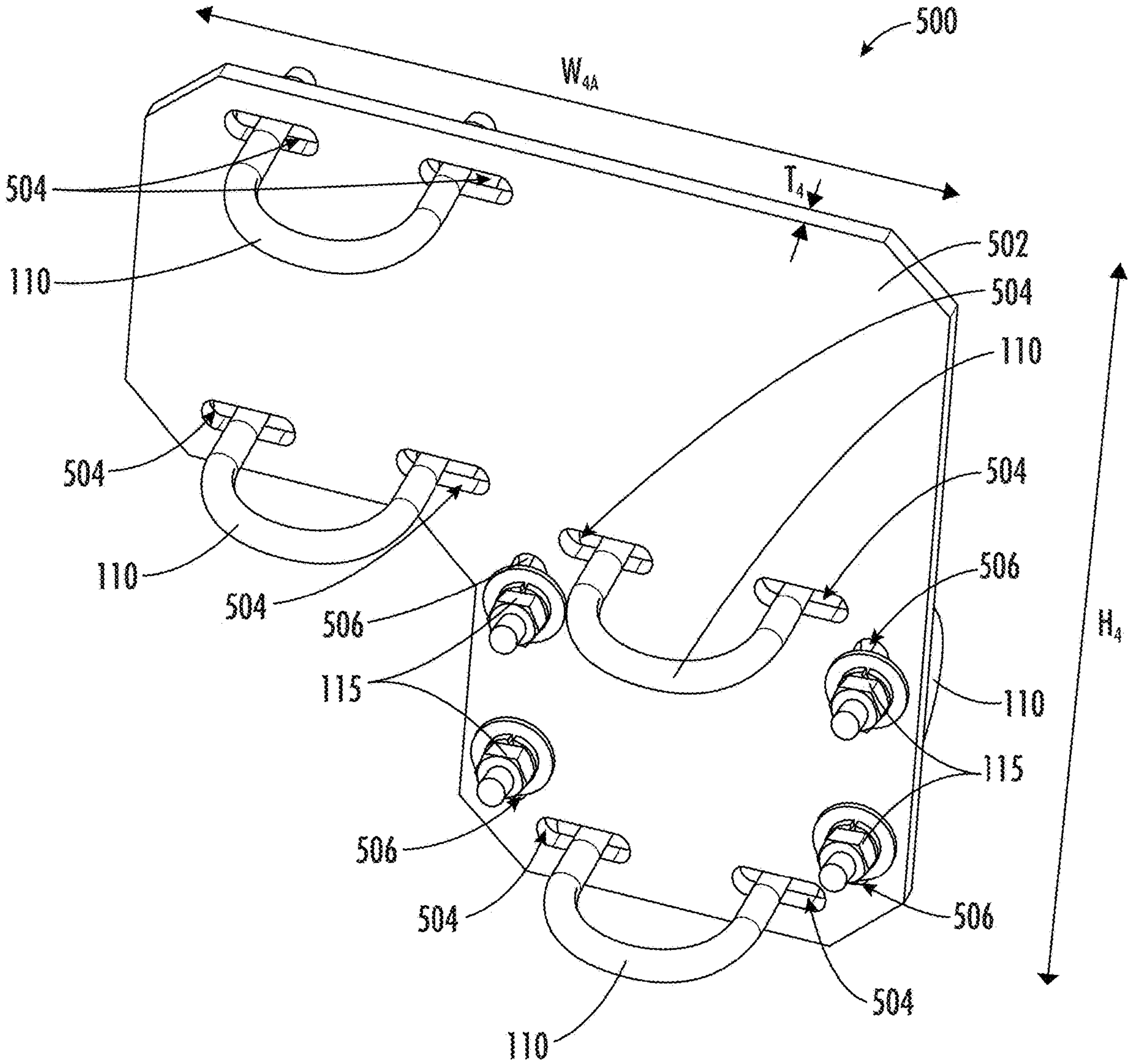
FIG. 9 is a perspective of another offset adapter according to embodiments of the present invention.

Referring now to FIG. 9 and FIG. 10, another offset adapter 500 according to embodiments of the present invention is illustrated. Properties and/or features of the offset adapter 500 may be as described above in reference to the offset adapter 200 shown in FIGS. 4A-4D and FIGS. 5A-5B, and duplicate discussion thereof may be omitted herein for the purposes of discussing FIG. 9. As described in further detail below, the offset adapter 500 differs from the offset adapter 200 described herein in that the offset adapter 500 does not include a pair of spaced apart flanges 208 which are configured to position the offset adapter 200 a distance $DO_1$ from the horizontal member 22, and thus, the offset adapter 500 is configured to be used to change the mounting location of an end vertical member 24 to such that the vertical member 24 is positioned or resides past the ends 22*e* of the horizontal members 22 (i.e., distance D2) (see, e.g., FIGS. 3A-3B and FIG. 10). In some embodiments, the offset adapter 500 may also be used to change the mounting location of an interior vertical member 24, for example, when there are no obstructions (e.g., mounting brackets) at the desired mounting location on the horizontal member 22. (see, e.g., FIG. 2).

As shown in FIG. 9, the offset adapter 500 may have a generally L-shaped main body 502 having a height $H_4$, an overall width $W_4$, and a thickness $T_4$. In some embodiments, the main body 502 of the offset adapter 500 has a height $H_4$ in a range of between about 8 inches and about 24 inches, an overall width $W_4$ in a range of between about 10 inches and about 24 inches, and a thickness $T_4$ in a range of between about 0.06 inches and about 0.50 inches. The main body 502 comprises a plurality of apertures 504, 506 with some of the apertures 504 being elongated horizontally (i.e., relative to the width $W_4$ of the main body 502) and some of the apertures 506 being elongated vertically (i.e., relative to the height $H_4$ of the main body 502). Each of the apertures 504, 506 are configured to receive a fastener 110. In some embodiments, the fastener 110 is a U-bolt and a pair of adjacent apertures 504, 506 are each configured to receive a portion of the U-bolt (i.e., fastener 110). The fasteners 110 are secured to the main body 502 of the offset adapter 500 via corresponding securing mechanisms 115 (e.g., washers and nuts).

The fasteners 110 are configured to engage a respective horizontal or vertical member 22, 24 to secure the offset adapter 500 thereto. The elongated apertures 504, 506 allow for some flexibility for the positioning the fasteners 110 therethrough with respect to the corresponding horizontal or vertical members 22, 24 and/or to accommodate different size fasteners 110. For example, as shown in FIG. 9, in some embodiments, the offset adapter 500 includes at least two fasteners 110 that are inserted through horizontally elongated apertures 504 and are configured to engage a vertical member 24 and at least two fasteners 110 that are inserted through vertically elongated apertures 506 and configured to engage a horizontal member 22 (see also, e.g., FIG. 10). Optionally, in some embodiments, the offset adapter 500 includes two additional fasteners 110 that are inserted through horizontally elongated apertures 504 and configured to engage an additional vertical member 24, if needed. Similar to offset adapters 200, 300, 400, it is noted that alternative fasteners (i.e., other than U-bolts) may be used to secure the horizontal and vertical members 22, 24 to the offset adapter 500 (see, e.g., FIG. 11).

Referring to FIG. 10, a sector frame mount assembly 100" according to embodiments of the present invention is illustrated which utilizes the offset adapter 500 described herein. As shown in FIG. 10, the offset adapter 500 allows the mounting location of the vertical member 24 (which resides past the end 22*e* of the horizontal member 22) to be moved a distance D2 (i.e., from a prior mounting location 24') in order to address issues with respect to PIM or other spacing issues. For example, in some embodiments, the offset adapter 500 of the present invention is configured to move the mounting location of a vertical member 24 a distance D2 in a range of between about 2 inches and about 12 inches, typically about 6 inches. The offset adapter 500 allows these PIM or spacing issues to be easily addressed without having to make any other changes to the sector frame mount assembly 100", thereby also reducing costs.

Figure 11:
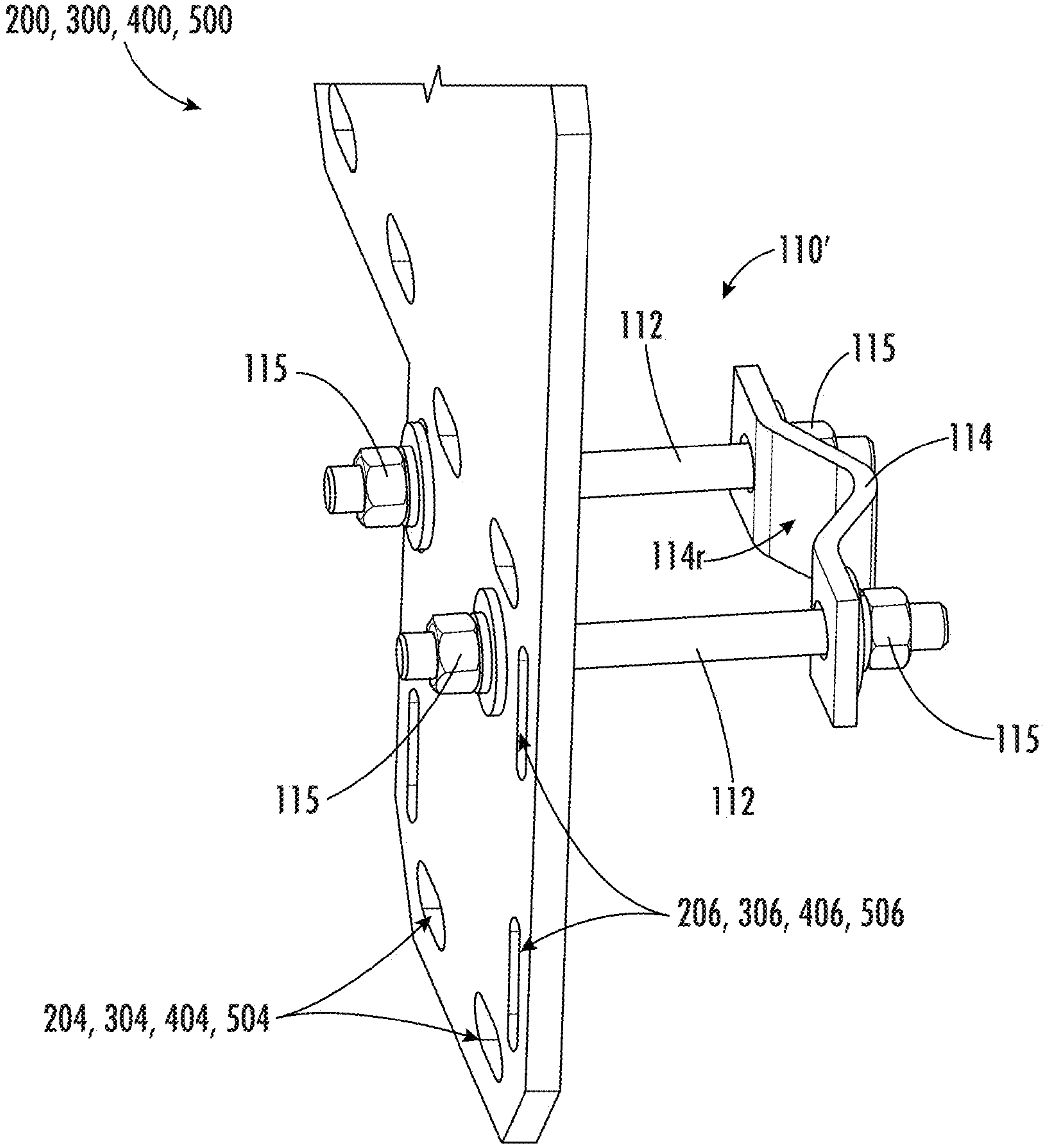
FIG. 11 is a perspective view of an alternative fastener that may be used to secure the vertical member and/or the horizontal member to any of the offset adapters of the present invention.

Referring to FIG. 11, an alternative fastener 110' that may be used with any of the offset adapters 200, 300, 400, 500 described herein is illustrated. As shown in FIG. 11, the fastener 110' includes two separate rods or bolts 112 that each are received within a respective aperture (i.e., vertically-elongated or horizontally-elongated) and are coupled to a clamping member 114. The clamping member 114 is configured to engage a vertical or horizontal member 22, 24. Corresponding securing mechanisms 115 (e.g., nuts and washers) are used on opposing ends of the rods/bolts 112 to tighten the clamping member 114 and secure the vertical or horizontal member 22, 24 to the offset adapter 200, 300, 400, 500. In some embodiments, the clamping member 114 has an arcuate (concave) recess 114*r* configured to receive at least a portion of the corresponding vertical or horizontal member 22, 24 being secured to the offset adapter 200, 300, 400, 500.

Referring now to FIGS. 12A-12D, another offset adapter 600 according to embodiments of the present invention is illustrated. In some embodiments, the offset adapter 600 may be used to change the mounting location of an interior vertical member 24 along the length of the horizontal members 22 (see, e.g., FIG. 2 and FIGS. 13A-13B). In other embodiments, the offset adapter 600 may be used to change the mounting location of an end vertical member 24 to such that the vertical member 24 resides past the ends 22*e* of the horizontal members 22 (see, e.g., FIGS. 3A-3B). Properties and/or features of the offset adapter 600 may be as described above in reference to the offset adapters 200, 300, 400, 500 described herein, and duplicate discussion thereof may be omitted herein for the purposes of discussing FIGS. 12A-12D.

As shown in FIGS. 12A-12D, the offset adapter 600 has a main body 602 having a height $H_5$, an overall width $W_5$, and a thickness $T_5$. In some embodiments, the main body 602 may be planar having a first outer surface 602*a* and a second opposing outer surface 602*b*. In some embodiments, the main body 602 of the offset adapter 600 has a height $H_5$ in a range of between about 8 inches and about 24 inches, an overall width $W_5$ in a range of between about 10 inches and about 24 inches, and a thickness $T_5$ in a range of between about 0.06 inches and about 0.50 inches.

Figure 12A:
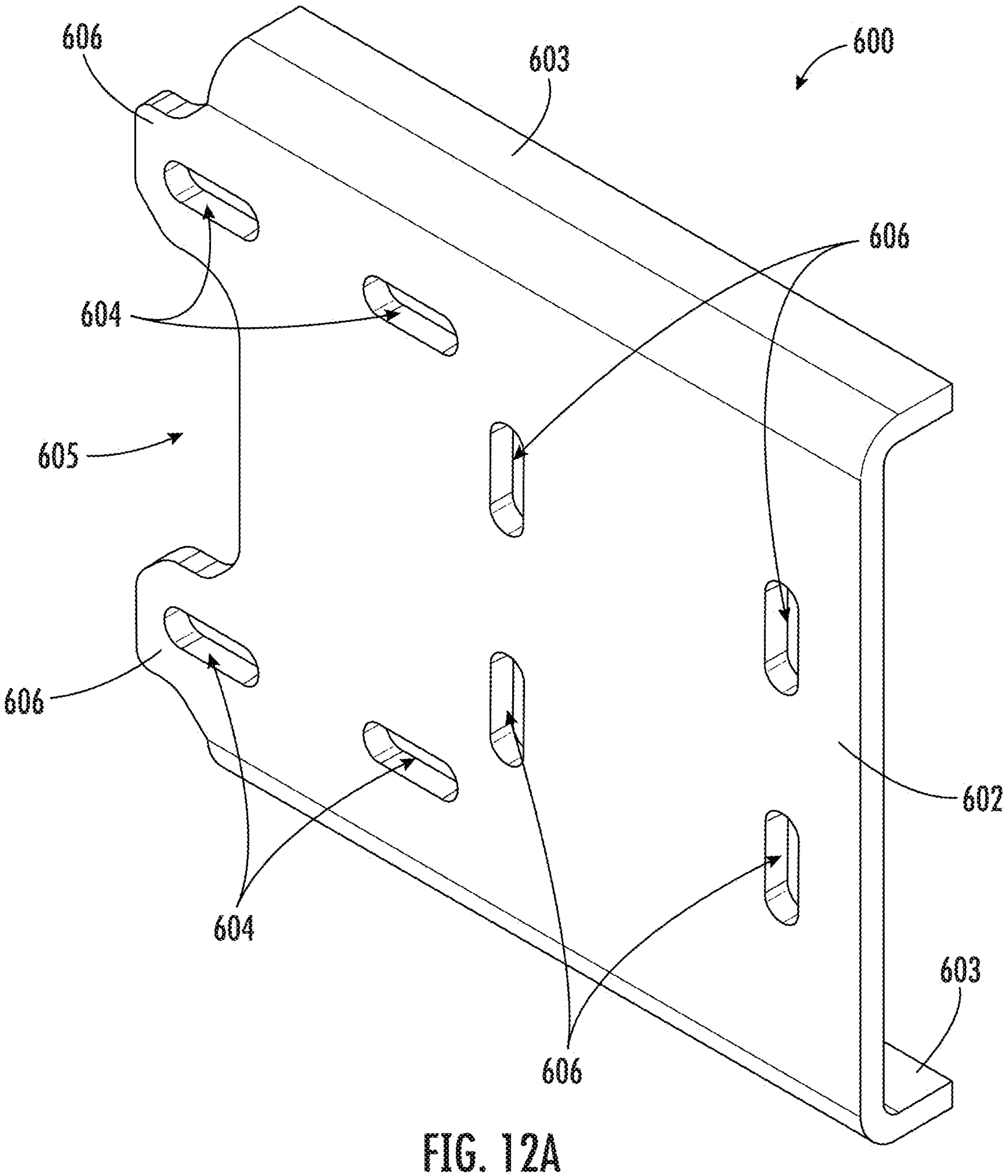
FIG. 12A is a front perspective view of an another offset adapter according to embodiments of the present invention.
Figure 12B:
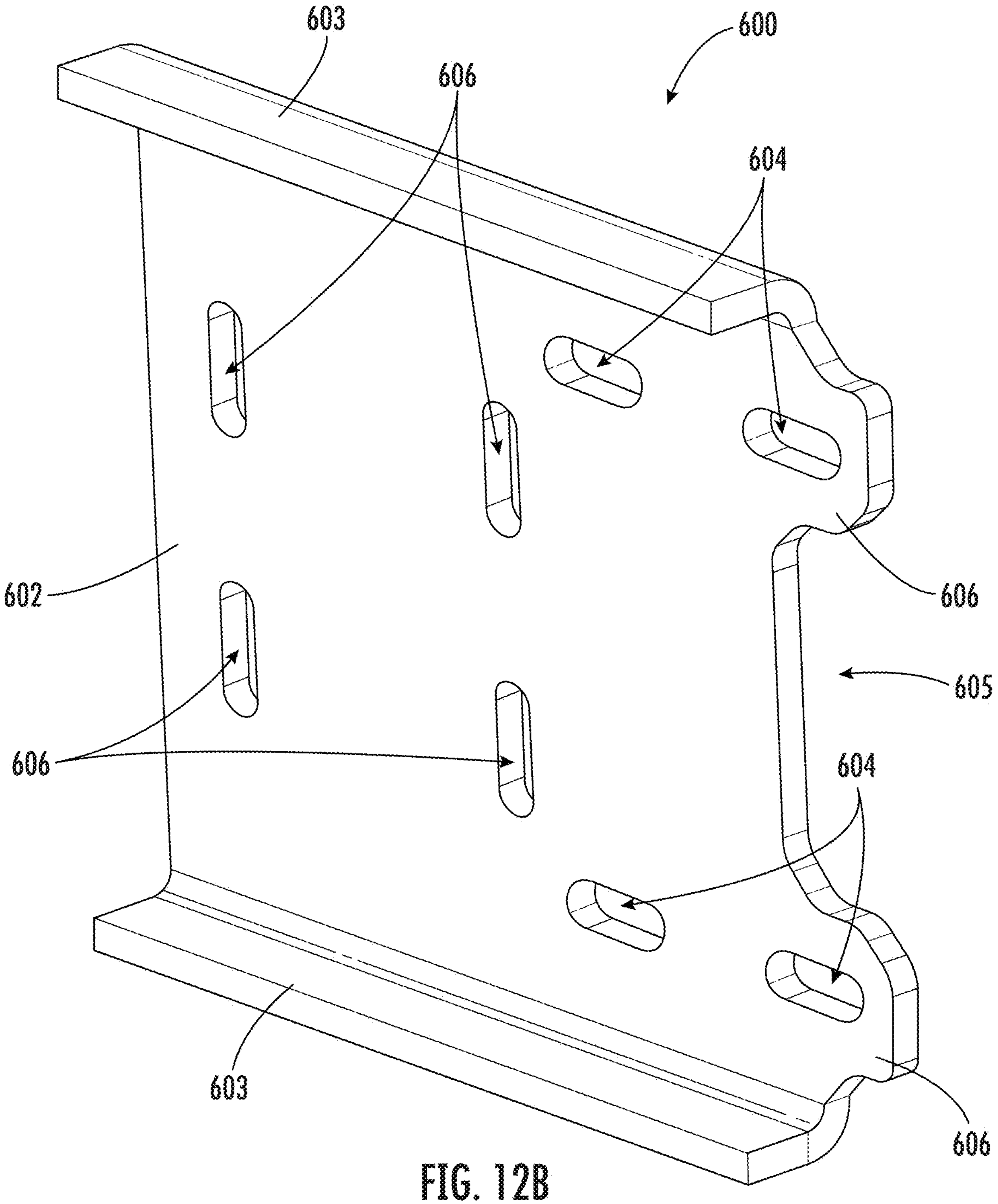
FIG. 12B is a rear perspective view of the offset adapter of FIG. 12A.
Figure 12C:
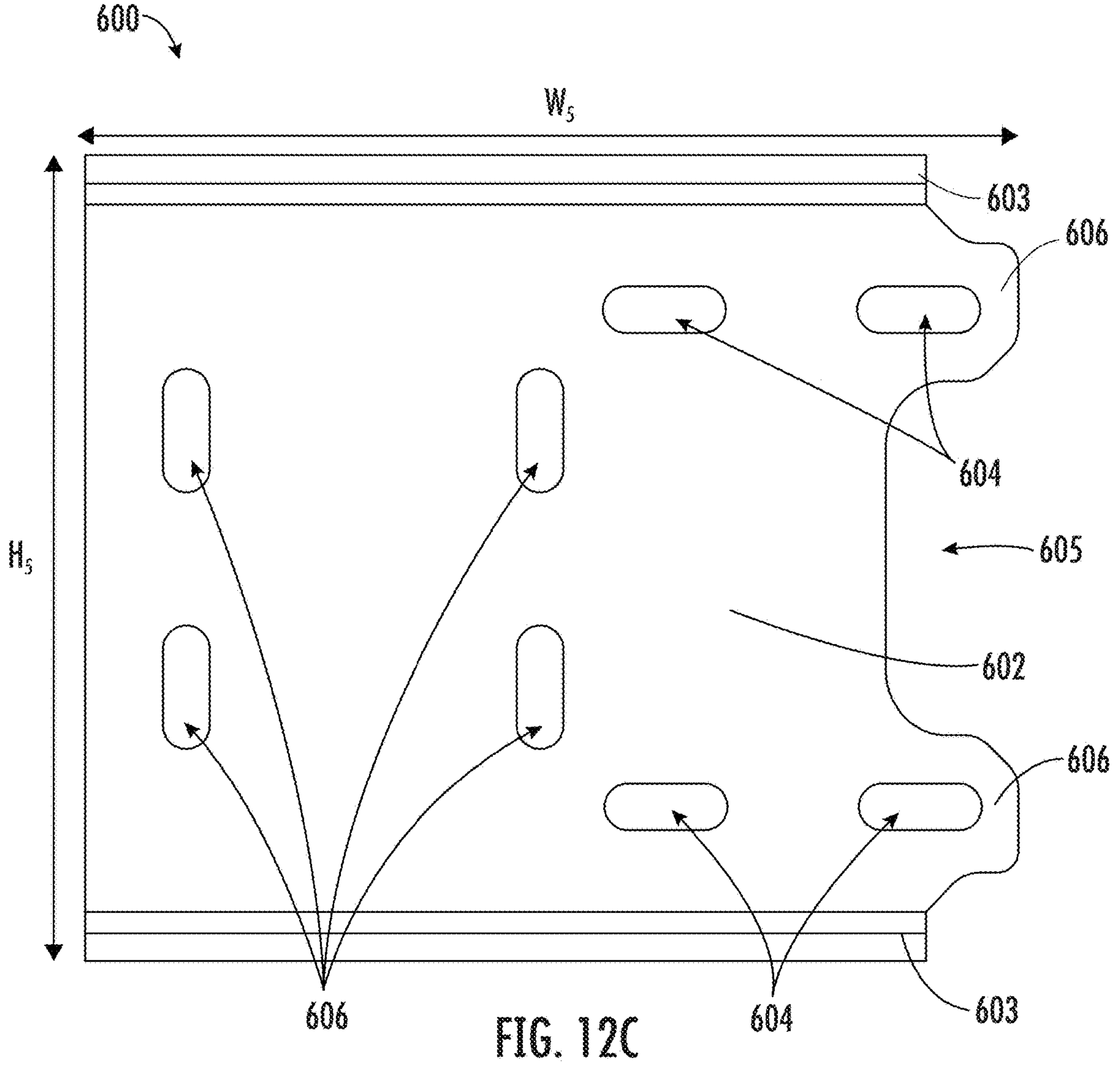
FIG. 12C is a rear view of the offset adapter of FIG. 12A.
Figure 12D:
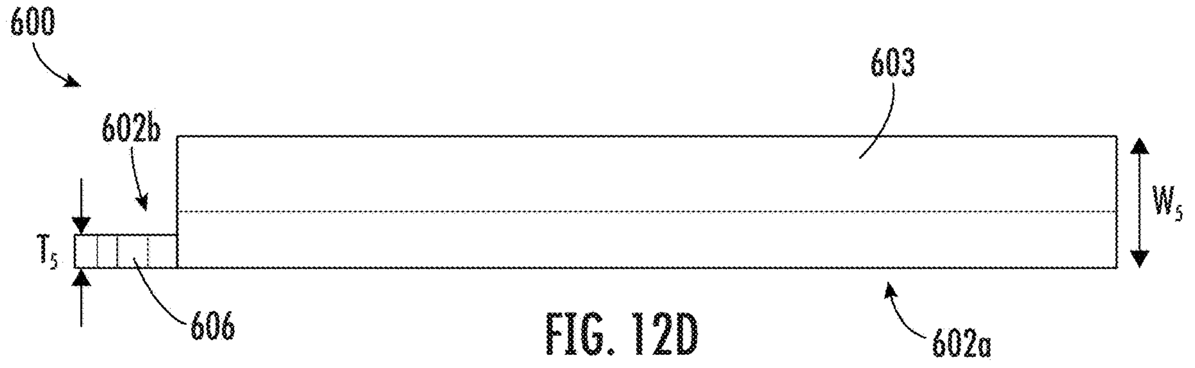
FIG. 12D is a side view of the offset adapter of FIG. 12A.

The main body 602 comprises a plurality of apertures 604, 606. As shown in FIGS. 12A-12C, some of the apertures 604 are elongated horizontally (i.e., relative to the width $W_5$ of the main body 602) and some of the apertures 606 are elongated vertically (i.e., relative to the height $H_5$ of the main body 602). Each of the apertures 604, 606 are configured to receive a fastener 110, 110' (similar to the other offset adapters 200, 300, 400, 500 described herein). In some embodiments, the fastener 110 is a U-bolt and a pair of adjacent apertures 604, 606 are each configured to receive a portion of the U-bolt (i.e., fastener 110). In some embodiments, an alternative fastener 110' may be used (see, e.g., FIG. 11). The fasteners 110 are secured to the main body 602 of the offset adapter 600 via corresponding securing mechanisms 115 (e.g., washers and nuts). The fasteners 110 are configured to engage a respective horizontal or vertical member 22, 24 to secure to the offset adapter 600 thereto. The elongated apertures 604, 606 allow for some flexibility for the positioning of the fasteners 110 therethrough with respect to the corresponding horizontal or vertical members 22, 24 and/or to accommodate different size fasteners 110. For example, as shown in FIGS. 13A-13B, in some embodiments, the offset adapter 600 includes at least two fasteners 110 that are inserted through horizontally elongated apertures 604 and are configured to engage a vertical member 24 and at least two fasteners 110 that are inserted through vertically elongated apertures 606 and configured to engage a horizontal member 22.

In some embodiments, the offset adapter 600 may comprise a pair of spaced-apart flanges 606 extend outwardly from the main body 602 to define a recess 605 therebetween. As shown in FIGS. 12A-12C, in some embodiments, at least a portion of a horizontally extending aperture 604 resides within each of the flanges 606.

In some embodiments, the main body 602 of the offset adapter 600 may further comprise flanged or bent opposing edges 603. The flanged edges 603 help to provide additional structural support to the adapter 600, for example, when the offset adapter 600 is used to secure a vertical member 24 beyond the end 22*e* of the horizontal member 22. In some embodiments, the flanged edges 603 extend a distance $D_5$ from the main body 602 in a range of between about 1 inch and about 4 inches.

Figure 13A:
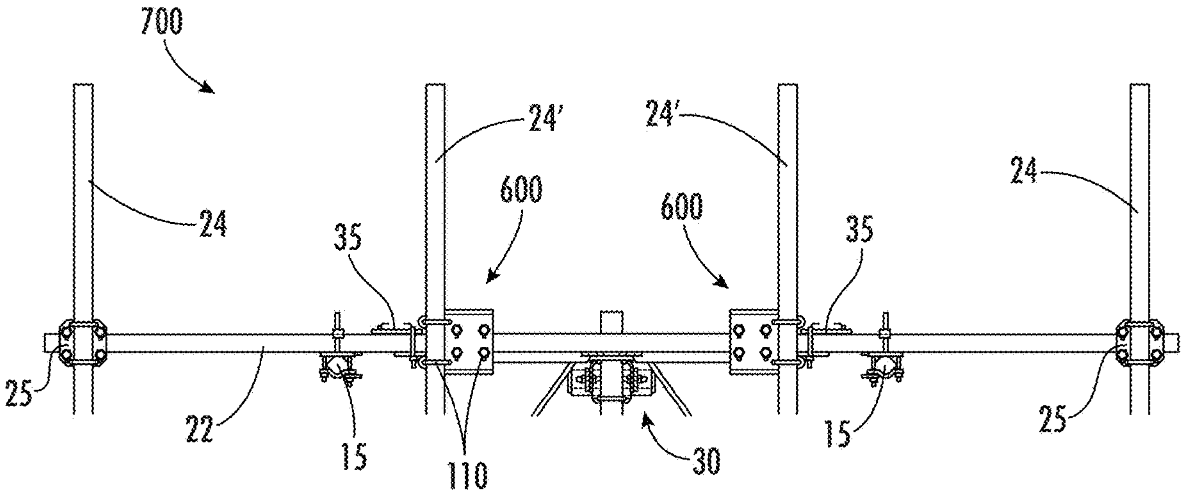
FIG. 13A is a partial front view of a sector frame antenna mount assembly utilizing two of the offset adapters illustrated in FIGS. 12A-12D.
Figure 13B:
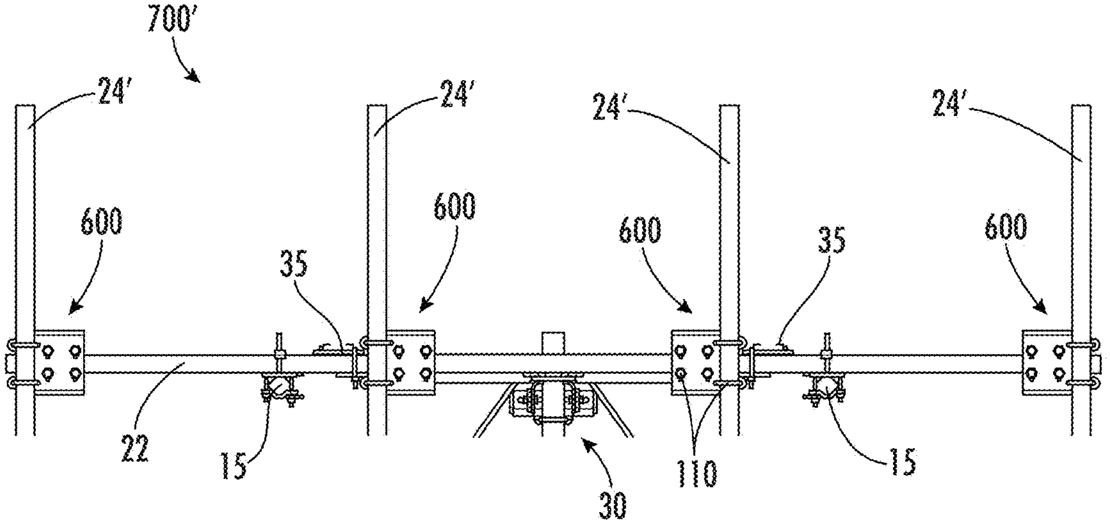
FIG. 13B is a partial front view of a sector frame antenna mount assembly utilizing four of the offset adapters illustrated in FIGS. 12A-12D.

Referring to FIGS. 13A-13B, a sector frame mount assembly 700 according to embodiments of the present invention is illustrated which utilizes one or more offset adapters 600 described herein. As shown in FIGS. 13A-13B, similar to the other offset adapters 200, 300, 400, 500 described herein, the offset adapter 600 allows the mounting location of the vertical member 24 to be moved in order to address issues with respect to PIM or other spacing issues without having to make any other changes to the sector frame mount assembly 700, thereby also reducing costs.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A sector frame antenna mount assembly, the assembly comprising:

a plurality of horizontal members, each horizontal member having a length;

a plurality of vertical members mounted on the horizontal members, each vertical member configured to have at least one antenna mounted thereon; and at least one offset adapter configured to mount a selected one of plurality of vertical members to a selected on of the plurality of horizontal members, the at least one offset adapter having a generally L-shaped planar main body having a height and a width, wherein the at least one offset adapter is configured to reposition the selected vertical member from a first mounting location to a second mounting location along the length of the selected horizontal member or past an end of the selected horizontal member, thereby addressing issues with respect to passive intermodulation or other spacing issues within the assembly.

2. The assembly according to claim 1, wherein the second mounting location of the selected vertical member is positioned from the first mounting location along the length of the selected horizontal member a distance in a range of between about 2 inches and about 12 inches.

3. The assembly according to claim 1, wherein the main body comprises a plurality of apertures including at least two horizontally-elongated apertures relative to the width of the main body and at least two vertically-elongated apertures relative to the height of the main body, wherein the at least two horizontally-elongated apertures are configured to receive one or more fasteners to engage and secure the selected vertical member to the offset adapter and the at least two vertically-elongated apertures are configured to receive one or more fasteners to engage and secure the selected horizontal member to the offset adapter.

4. The assembly according to claim 3, wherein the height of the offset adapter is in a range of between about 8 inches and about 24 inches and the width of the offset adapter is in a range of between about 10 inches and about 24 inches.

5. The assembly according to claim 3, wherein the offset adapter includes at least two fasteners that are inserted through horizontally-elongated apertures and are configured to engage a vertical member and at least two fasteners that are inserted through vertically-elongated apertures and are configured to engage a horizontal member.

6. The assembly according to claim 3, wherein the offset adapter comprises a pair of spaced-apart flanges extending outwardly from the main body a distance in a range of between about 0.5 inches and about 6 inches, the spaced-apart flanged configured to position the main body of the offset adapter away from the selected horizontal member and any obstruction that may reside at the second mounting location along the length of the selected horizontal member.

7. An offset adapter for a sector frame antenna mount assembly, the sector frame antenna mount assembly comprising a plurality of horizontal members and a plurality of vertical members, the offset adapter comprising:

a generally L-shaped planar main body having a height and a width; and a plurality of apertures, the plurality of apertures including at least two horizontally-elongated apertures relative to the width of the main body and at least two vertically-elongated apertures relative to the height of the main body, wherein the at least two horizontally-elongated apertures are configured to receive one or more fasteners to engage and secure a selected vertical member of the plurality of vertical members to the offset adapter, wherein the at least two vertically-elongated apertures are configured to receive one or more fasteners to engage and secure a selected horizontal member of the plurality of horizontal members to the offset adapter, and wherein the offset adapter is configured to reposition the selected vertical member from a first mounting location to a second mounting location along a length of the selected horizontal member or past an end of the selected horizontal member.

8. The assembly according to claim 7, wherein the second mounting location of the selected vertical member is a distance from the first mounting location in a range of between about 2 inches and about 12 inches.

9. The assembly according to claim 7, wherein the second mounting location of the selected vertical member is a distance from the first mounting location in a range of between about 2 inches and about 12 inches.

10. The assembly according to claim 7, wherein the offset adapter includes at least two fasteners that are inserted through horizontally-elongated apertures and are configured to engage a vertical member and at least two fasteners that are inserted through vertically-elongated apertures and are configured to engage a horizontal member, and optionally, wherein the offset adapter includes at least two additional fasteners that are inserted through horizontally-elongated apertures and are configured to engage an additional vertical member.

11. The assembly according to claim 7, wherein the fasteners are U-bolts secured to the main body via corresponding securing mechanisms.

12. The assembly according to claim 7, wherein the offset adapter comprises a pair of spaced-apart flanges extending outwardly from the main body a distance in a range of between about 6 inches and about 20 inches, the spaced-apart flanged configured to position the main body of the offset adapter away from the selected horizontal member and any obstruction that may reside at the second mounting location along the length of the selected horizontal member.

13. An offset adapter for a sector frame antenna mount assembly, the sector frame antenna mount assembly comprising a plurality of horizontal members and a plurality of vertical members, the offset adapter comprising:

a generally planar main body having a height and a width; and a plurality of apertures, the plurality of apertures including four pairs of horizontally-elongated apertures relative to the width of the main body and at least two pairs of vertically-elongated apertures relative to the height of the main body, wherein two of the pairs of horizontally-elongated apertures are horizontally and vertically offset relative to the width and height of the main body, respectively, from the other two pairs of horizontally-elongated apertures, wherein the two pairs of vertically-elongated apertures are vertically offset relative to the height of the main body from the four pairs of horizontally-elongated apertures, wherein each pair of horizontally-elongated apertures are configured to receive a respective U-bolt fastener to engage and secure a selected vertical member of the plurality of vertical members to the offset adapter, wherein each pair of vertically-elongated apertures are configured to receive a respective U-bolt fastener to engage and secure a selected horizontal member of the plurality of horizontal members to the offset adapter, and wherein the offset adapter is configured to reposition the selected vertical member from a first mounting location to a second mounting location along a length of the selected horizontal member or past an end of the selected horizontal member.

14. The offset adapter according to claim 13, wherein the planar main body comprises opposing flanged edges.

* * * * *